US011635024B2

(12) United States Patent
Letourneau et al.

(10) Patent No.: US 11,635,024 B2
(45) Date of Patent: Apr. 25, 2023

(54) PUSHER TURBOPROP POWERPLANT INSTALLATION

(71) Applicant: PRATT & WHITNEY CANADA CORP., Longueuil (CA)

(72) Inventors: Laurent Letourneau, Greenfield Park (CA); Keith Morgan, Westmount (CA); John Wilson, Pointe-Claire (CA); Paul Weaver, Chateauguay (CA); Eric Durocher, Boucherville (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 227 days.

(21) Appl. No.: 16/991,224

(22) Filed: Aug. 12, 2020

(65) Prior Publication Data

US 2021/0047964 A1  Feb. 18, 2021

Related U.S. Application Data

(60) Provisional application No. 62/890,127, filed on Aug. 22, 2019, provisional application No. 62/888,159, filed on Aug. 16, 2019.

(51) Int. Cl.
*F02C 7/052* (2006.01)
*B64D 27/12* (2006.01)
(Continued)

(52) U.S. Cl.
CPC .............. *F02C 7/052* (2013.01); *B64D 27/12* (2013.01); *B64D 33/02* (2013.01); *B64D 33/08* (2013.01);
(Continued)

(58) Field of Classification Search
CPC ... F02C 7/052; F02C 7/04; F02C 7/14; B64D 27/12; B64D 33/02; B64D 33/08; B64D 2033/0246; B64D 2033/0293
See application file for complete search history.

(56) References Cited

U.S. PATENT DOCUMENTS 2,625,009 A * 1/1953 Leggett ..................... F02C 7/14
60/785
4,930,725 A 6/1990 Thompson et al.
(Continued)

FOREIGN PATENT DOCUMENTS

EP  3211199  8/2017

OTHER PUBLICATIONS

European Search Report for Application No. 20191228.4 dated May 10, 2021.

*Primary Examiner* — Steven M Sutherland
(74) *Attorney, Agent, or Firm* — Norton Rose Fulbright Canada LLP

(57) ABSTRACT

A turboprop gas turbine engine mountable to an aircraft has an engine core and a gearbox driving a propeller, the engine core and the gearbox being enclosed within a nacelle. The propeller is located rearward of the gearbox and the engine core relative to a direction of travel of the aircraft. An air intake is disposed within the nacelle and formed to direct ambient air into the engine core. The air intake includes an air inlet duct, having a forward-facing intake inlet receiving the ambient air, with an upstream section and a downstream section. The upstream section is in fluid communication with the intake inlet and extends downstream from the intake inlet. The downstream section fluidly connects to and directs air from the upstream section into the engine air inlet. A second air outlet duct is located within the nacelle and directs air into an air-cooled-oil-cooler (ACOC).

20 Claims, 11 Drawing Sheets

Pilot view

(51) Int. Cl.
    *B64D 33/02*     (2006.01)
    *B64D 33/08*     (2006.01)
    *F02C 7/04*     (2006.01)
    *F02C 7/14*     (2006.01)

(52) U.S. Cl.
    CPC ............... *F02C 7/04* (2013.01); *F02C 7/14* (2013.01); *B64D 2033/0246* (2013.01); *B64D 2033/0293* (2013.01)

(56) References Cited

U.S. PATENT DOCUMENTS

| | | |
|---|---|---|
| 5,987,877 A | 11/1999 | Steiner |
| 6,000,210 A | 12/1999 | Negulescu |
| 6,282,881 B1 | 9/2001 | Beutin et al. |
| 7,159,819 B2 | 1/2007 | Machado et al. |
| 8,226,028 B2 | 7/2012 | Marche |
| 9,238,511 B2 | 1/2016 | Woolley et al. |
| 9,522,739 B2 | 12/2016 | Chouard et al. |
| 10,054,050 B2 | 8/2018 | Labrecque et al. |
| 10,144,526 B2 | 12/2018 | Zameroski et al. |
| 2005/0178888 A1 | 8/2005 | Machado et al. |
| 2010/0212285 A1 | 8/2010 | Negulescu |
| 2011/0179767 A1 | 7/2011 | Rinjonneau et al. |
| 2012/0091265 A1 | 4/2012 | Stretton et al. |
| 2014/0064950 A1 | 3/2014 | Brochard et al. |
| 2015/0300265 A1 | 10/2015 | Suciu et al. |
| 2017/0241342 A1* | 8/2017 | Gekht ............... F02C 7/04 |
| 2017/0313431 A1 | 11/2017 | Florent et al. |
| 2018/0148186 A1 | 5/2018 | Bouchet et al. |

\* cited by examiner

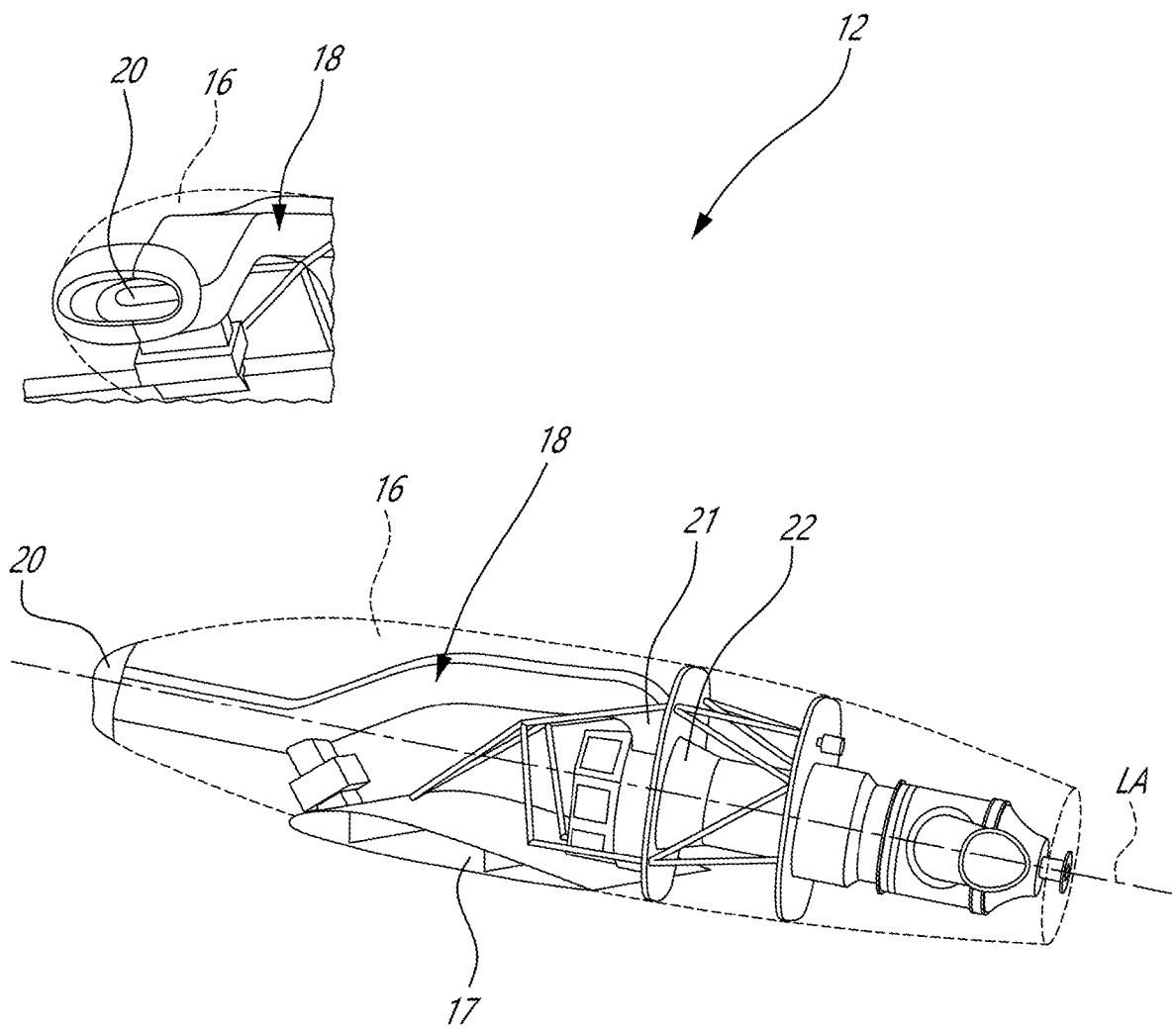
FIG_2

Pilot view

Pilot view

Pilot view

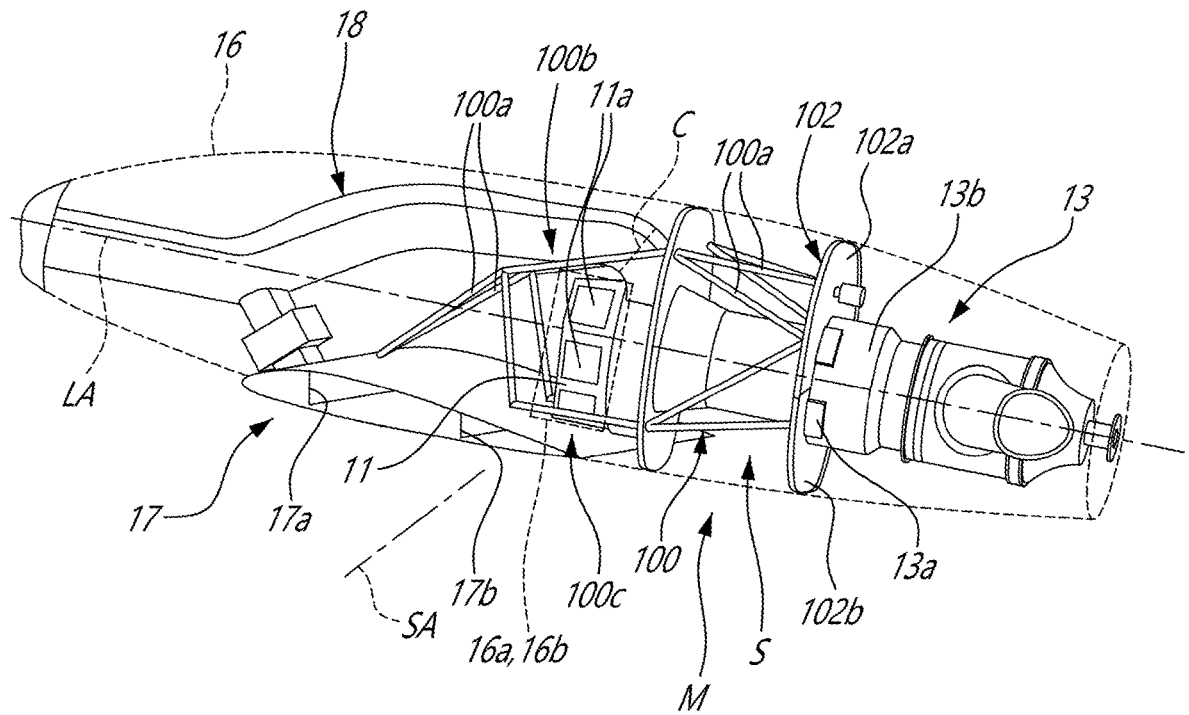
FIG. 16
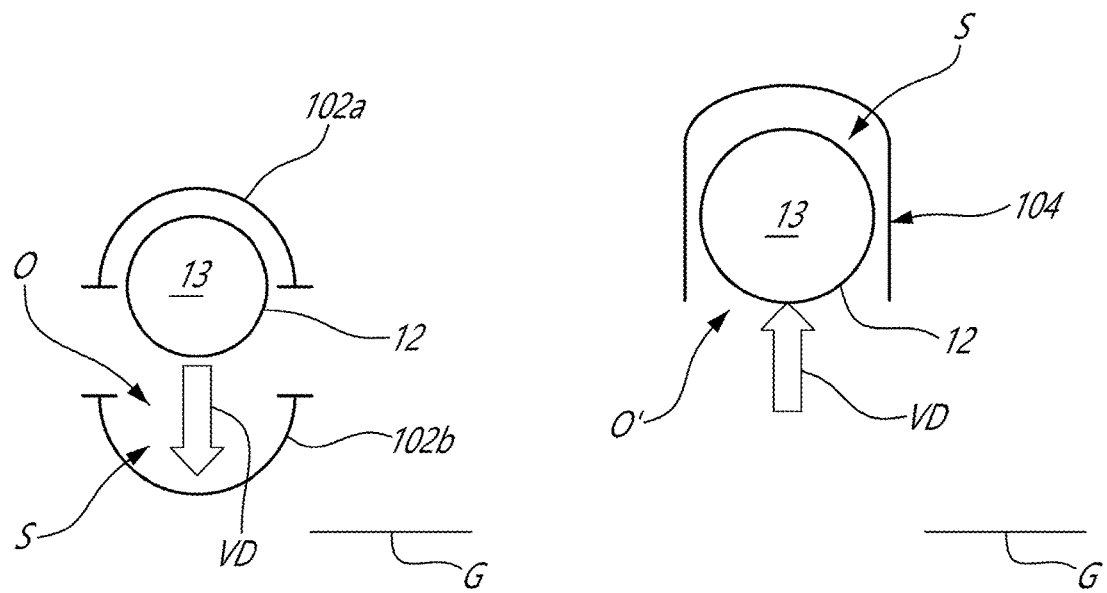
FIG. 17
FIG. 18

PUSHER TURBOPROP POWERPLANT INSTALLATION

CROSS-REFERENCE TO RELATED APPLICATIONS

This application claims priority from U.S. patent applications 62/888,159 filed on Aug. 16, 2019 and 62/890,127 filed on Aug. 22, 2019, the entire contents of which are incorporated by reference herein.

TECHNICAL FIELD

The disclosure relates generally to turboprop powered aircraft and turboprop powerplants, and more particularly to pusher turboprop powerplant installations.

BACKGROUND

Turboprop gas turbine engines are most commonly mounted to aircraft in a "tractor" (or "puller") configuration, whereby the engine is mounted with the propeller located forward of the engine (relative to a direction of travel of the aircraft) such that the aircraft is "pulled" through the air by the propeller. Turboprop engines may however also be mounted to an aircraft in a "pusher" configuration, whereby the engine is mounted with the propeller located behind the engine (relative to the direction of travel of the aircraft). Much as engines mounted in a tractor configuration can be mounted to the wings or in the nose of the fuselage, pusher engines can be either wing mounted, mounted to the fuselage tail and/or to pylons on the aircraft.

Challenges exist with some existing pusher turboprop installations, however, which make the use of pusher configurations less common than tractor powerplant installations. In a pusher powerplant installation, for example, the center of gravity of the powerplant may be located further rearward in comparison with those in puller configurations, and the overall envelope of the nacelle required may also be longer than for a comparable tractor powerplant configuration, more complex structural mounting configurations may be required, air inlet ducting may be more difficult, and/or foreign object damage considerations may also be more difficult to manage.

Improvements in pusher gas turbine engine powerplants and their installations are therefore sought.

SUMMARY

In a first aspect, there is provided a turboprop gas turbine engine adapted to be mounted to an aircraft, the turboprop gas turbine engine comprising: an engine core and a gearbox driving a propeller, the engine core and the gearbox being enclosed within a nacelle, the propeller located rearward of the gearbox and the engine core relative to a direction of travel of the aircraft, the turboprop gas turbine engine being a pusher engine; and an air intake disposed within the nacelle and formed to direct ambient air into the engine core of the turboprop gas turbine engine, the air intake including an air inlet duct having a forward-facing intake inlet receiving the ambient air, the air inlet duct including an upstream section and a downstream section, the upstream section of the air inlet duct in fluid communication with the intake inlet and extending downstream from the intake inlet, the downstream section of the air inlet duct fluidly connected to and directing air from the upstream section into the engine air inlet of the engine core, and a second air outlet duct located within the nacelle, the second air outlet duct directing air into an air-cooled-oil-cooler (ACOC).

In accordance with the first aspect, the ACOC and the second air outlet duct are located axially forward of the engine core.

In accordance with the first aspect, the second air outlet duct is connected to the air inlet duct at a location between the upstream section and the downstream section thereof.

In accordance with the first aspect, the second air outlet duct is connected in fluid flow communication with the air inlet duct at a location between the intake inlet and the engine air inlet, the second air outlet duct directing air from the upstream section of the air inlet duct to the ACOC.

In accordance with the first aspect, the second air outlet duct has an inlet located outside of the nacelle, the airflow for the ACOC within the second air outlet duct being distinct from the air directed through the air inlet duct and into the engine air inlet of the engine core.

In accordance with the first aspect, an inertial particle separator (IPS) is located downstream of the intake inlet and upstream of the engine air inlet, the inertial particle separator operable to redirect FOD particles in the air flowing through the air inlet duct into an IPS duct connected in fluid flow communication with the air inlet duct.

In accordance with the first aspect, the ACOC and the IPS are integrated into a common duct located axially forward of the engine core and of the wing of the aircraft.

In accordance with the first aspect, the IPS duct is located axially forward of the engine core, an outlet of the IPS duct disposed to expel the FOD particles out of the nacelle and away from a wing of the aircraft.

In accordance with the first aspect, the IPS includes one or more FOD-deflectors that extend at least partially into the air inlet duct, the one or more FOD-deflectors redirect the FOD particles into the IPS duct which is connected to the air inlet duct at or downstream from the one or more FOD-deflectors.

In accordance with the first aspect, the one or more FOD-deflectors include a plate extending into the air inlet duct at an angle relative to an outer wall of the air inlet duct.

In accordance with the first aspect, the plate is movable between a deployed position and a retracted position, and wherein in the deployed position the plate protruding into the air inlet duct to redirect FOD and in the retracted position the plate being substantially withdrawn from the airflow through the air inlet duct and generating less flow restriction.

In accordance with the first aspect, the plate is actively controlled and positionable in any one or more of the deployed position, the retracted portion, and any angular position therebetween.

In accordance with the first aspect, a plurality of plates extend into the air inlet duct, at least a first one of the plurality of plates extending away from a wall of the air inlet duct in a downstream direction, and at least a second one of the plurality of plates extending from a wall of the air inlet duct in an upstream direction.

In accordance with the first aspect, the second one of the plurality of plates is located more downstream within the air inlet duct relative to the first one of the plurality of plates.

In accordance with the first aspect, the first one of the plurality of plates and the second one of the plurality of plates are disposed on opposite walls of the air inlet duct.

In accordance with the first aspect, the engine core of the turboprop gas turbine engine defines a longitudinal axis, and the intake inlet of the air intake extends along an intake axis that is substantially parallel to the longitudinal axis.

In accordance with the first aspect, the intake axis of the air intake is substantially coaxial with the longitudinal axis of the turboprop gas turbine engine.

In accordance with the first aspect, the intake axis of the air intake is radially spaced apart from the longitudinal axis of the turboprop gas turbine engine.

In accordance with a second aspect, there is provided a turboprop gas turbine engine adapted to be mounted to an aircraft, the turboprop gas turbine engine comprising: an engine core and a gearbox driving a propeller, the engine core and the gearbox being enclosed within a nacelle, the propeller located rearward of the gearbox and the engine core relative to a direction of travel of the aircraft, the turboprop gas turbine engine being a pusher engine; an air inlet duct located within the nacelle, the air inlet duct having a forward-facing intake inlet receiving ambient air from outside the nacelle and an outlet in fluid flow communication with the core of the engine; and an oil cooler duct located within the nacelle, the oil cooler duct being in fluid flow communication with an air-cooled-oil-cooler (ACOC) of the turboprop gas turbine engine, an inlet of the oil cooler duct being connected with either the air inlet duct to receive air therefrom or to a separate air inlet receiving ambient air from outside the nacelle.

In accordance with a third aspect, there is provided a turboprop gas turbine engine mountable to a wing of an aircraft, comprising: an engine core and a gearbox driving a propeller, the propeller located rearward of the gearbox and the engine core relative to a direction of travel of the aircraft, the turboprop gas turbine engine being a pusher engine; a mounting structure securing the engine core to the wing of the aircraft, the mounting structure having a frame securable to the wing and including frame members secured to one another, the frame defining an engine-receiving space, and a U-shaped mount secured to the frame and securable to the engine core upon the engine core received within the engine-receiving space, the engine core receivable within the U-shaped mount and within the engine-receiving space along a vertical direction relative to a ground.

In accordance with the third aspect, the turboprop gas turbine engine has an accessory gearbox in driving engagement with a shaft of the engine core, the accessory gearbox defining an output, the output facing a direction having a radial component relative to a longitudinal axis of the engine core.

In accordance with the third aspect, the engine core and the gearbox are enclosed within a nacelle, the nacelle defining an accessory opening for accessing an accessory drivingly engaged to the output.

In accordance with the third aspect, the engine core is received within the U-shaped mount via an opening of the U-shaped mount, the opening facing the ground when the aircraft is on the ground, the engine core receivable within the engine-receiving space in an upward direction away from the ground.

In accordance with the third aspect, the engine core is received within the U-shaped mount via an opening of the U-shaped mount, the opening facing away from the ground when the aircraft is on the ground, the engine core receivable within the engine-receiving space in a downward direction toward the ground.

In accordance with the third aspect, the U-shaped mount includes upper and lower U-shaped mounts securable to one another to enclose the engine core, the upper U-shaped mount secured to the engine core, the lower U-shaped mount secured to the frame.

In accordance with the third aspect, the frame has an upper frame portion secured to the upper U-shaped mount and a lower frame portion securable to the wing and secured to the lower U-shaped mount, the upper frame portion securable to the lower frame portion.

In accordance with the third aspect, the engine core is secured to the U-shaped mount via pads circumferentially distributed around and secured to a case of the engine core.

In accordance with a fourth aspect, there is provided a method of mounting a pusher turboprop gas turbine engine to a wing of an aircraft, the pusher turboprop gas turbine engine having an engine core and a gearbox driving a propeller, the method comprising: securing a mounting structure to the wing of the aircraft, the mounting structure having a frame defining an engine-receiving space and a U-shaped mount secured to the frame; inserting the engine core within the engine-receiving space by changing an elevation of the engine core relative to a ground and until the engine core is at least partially enclosed by the U-shaped mount, the propeller located rearward of the gearbox and the engine core relative to a direction of travel of the aircraft; and securing the engine core to the U-shaped mount.

In accordance with the fourth aspect, an air inlet is secured to the engine core after the engine core is secured to the U-shaped mount.

In accordance with the fourth aspect, inserting the engine core within the engine-receiving space includes increasing the elevation of the engine core relative to the ground when the aircraft is on the ground.

In accordance with the fourth aspect, inserting the engine core within the engine-receiving space includes decreasing the elevation of the engine core relative to the ground when the aircraft is on the ground.

In accordance with the fourth aspect, the U-shaped mount is a lower U-shaped mount, the method comprising securing an upper U-shaped mount to the engine core before inserting the engine core in the engine-receiving space, and securing the engine core to the lower U-shaped mount after the engine core is received in the engine-receiving space.

In accordance with the fourth aspect, securing the engine core to the U-shaped mount includes securing the engine core to the U-shaped mount via pads distributed circumferentially around the engine core and secured to a case of the engine core.

Further details of these and other aspects of the subject matter of this application will be apparent from the detailed description and drawings included below.

BRIEF DESCRIPTION OF THE DRAWINGS

Reference is now made to the accompanying drawings, in which:

FIG. 2 is shows a perspective view of an exemplary wing-mounted pusher turboprop gas turbine engine for the aircraft of FIG. 1, with a nacelle thereof shown partially transparent;

FIG. 16 is a perspective view of an exemplary wing-mounted pusher turboprop gas turbine engine for the aircraft of FIG. 1, with a nacelle thereof shown partially transparent;

FIG. 17 is a schematic cross-sectional view of an engine core of the pusher gas turbine engine of FIG. 16 taken on a plane normal to a longitudinal axis of the pusher gas turbine engine and illustrating mounts of a mounting structure for securing the engine core to a wing of the aircraft of FIG. 1; and FIG. 18 is a schematic cross-sectional view of the engine core of the pusher gas turbine engine of FIG. 16 taken on the plane normal to the longitudinal axis of the pusher gas turbine engine and illustrating a mount of a mounting structure in accordance with another embodiment for securing the engine core to the wing of the aircraft of FIG. 1.

DETAILED DESCRIPTION

Figure 1:
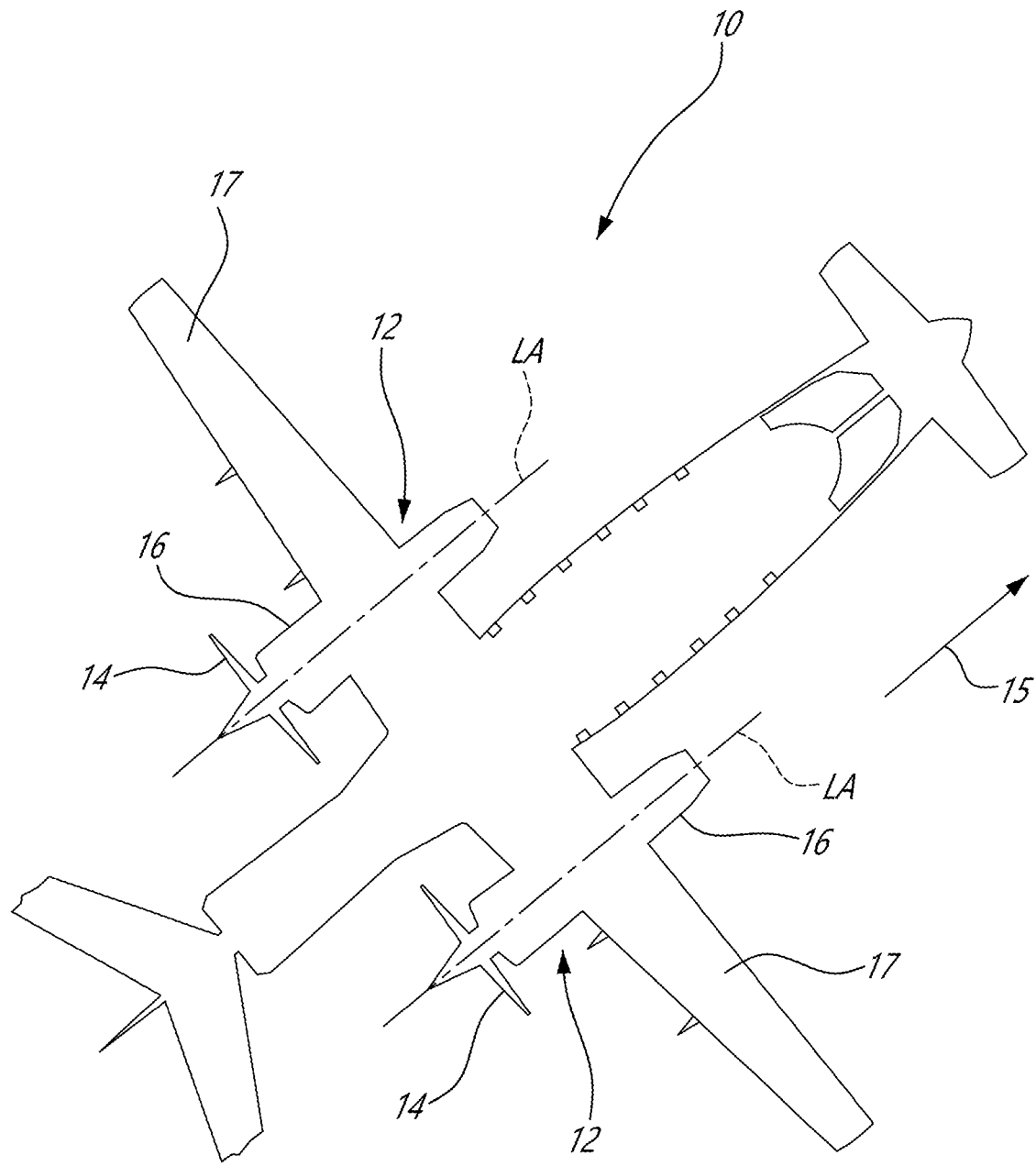
FIG. 1 is a schematic top plan view of an aircraft having turboprop gas turbine engines mounted to the wings of the aircraft in pusher configurations.

FIG. 1 illustrates an exemplary aircraft 10 to which one or more gas turbine engines 12 may be mounted. The gas turbine engines 12 are turboprops, and are mounted to the aircraft in pusher configurations, whereby the engine is mounted with the propeller 14 located behind the engine (relative to the direction of travel 15 of the aircraft 10—also referred to herein and depicted in the drawings as the "pilot view" direction). In the embodiment of FIG. 1, the pusher turboprop gas turbine engines 12 (or simply "pusher engines") are mounted to the wings 17 of the aircraft.

The terms "upstream" and "downstream" as used herein, unless indicated otherwise, are understood to be relative to the direction of travel 15 of the aircraft (i.e. the "pilot view" direction). Similarly, the terms "forward" and "rearward" as used herein are also understood to be relative to the direction of travel 15 of the aircraft.

Each pusher engine 12 as described herein will generally be referred to in the singular, however it is to be understood that two or more or each of such engines may be provided on the aircraft 10.

Each pusher engine 12 defines a longitudinal axis LA (e.g., central axis). In various embodiments, longitudinal axis LA may correspond to an axis of rotation of propeller 14 and/or longitudinal axis LA may correspond to an axis of rotation of a low-pressure spool and/or a high-pressure spool of a core 13 of the gas turbine engine 12. Each gas turbine engine 12 may be housed in a nacelle 16, serving as an aerodynamically-shaped covering for gas turbine engine 12.

The pusher engine 12 accordingly includes an engine core 13 (including compressor(s) 22, combustor 24 and turbine(s) 26) and a reduction gearbox 38 which drives the propeller 14, which is located rearward of the gas turbine engine 12, relative to a direction of travel of the aircraft, as is the case for pusher-style engines.

The pusher engines as described in further detail below are generally intended to be wing-mounted, in that the nacelle 16 and the engine 12 are mounted to, and overtop of, a wing 17 of the aircraft 10. However, as mentioned above, it is to be understood that the pusher turboprop engines and installations described herein may also be adapted for being mounted to the fuselage of the aircraft and/or to pylons mounted to the aircraft.

Referring to FIG. 2, the gas turbine engine 12 comprises an air intake 18 for channeling a flow of ambient air into gas turbine engine 12. Air intake 18 comprises intake inlet 20 that is generally forward-facing and, in at least one particular embodiment, may be substantially aligned with the longitudinal axis LA of the engine 12. In typical pusher installations, the air intake is often offset radially outwardly (e.g. downwardly) relative to the longitudinal axis LA of engine. In at least some of the embodiments described herein, however, the intake inlet 20 of the air intake 18 is substantially axially aligned with the gas turbine engine 12, thereby allowing for a slimmer (e.g. smaller diameter) nacelle 16. Intake inlet 20 may be generally forward-facing, so that ambient air ingested into the air intake 18 is directed rearward within the envelope of the nacelle and to the engine air inlet 21 of the engine 12.

Figure 3A:
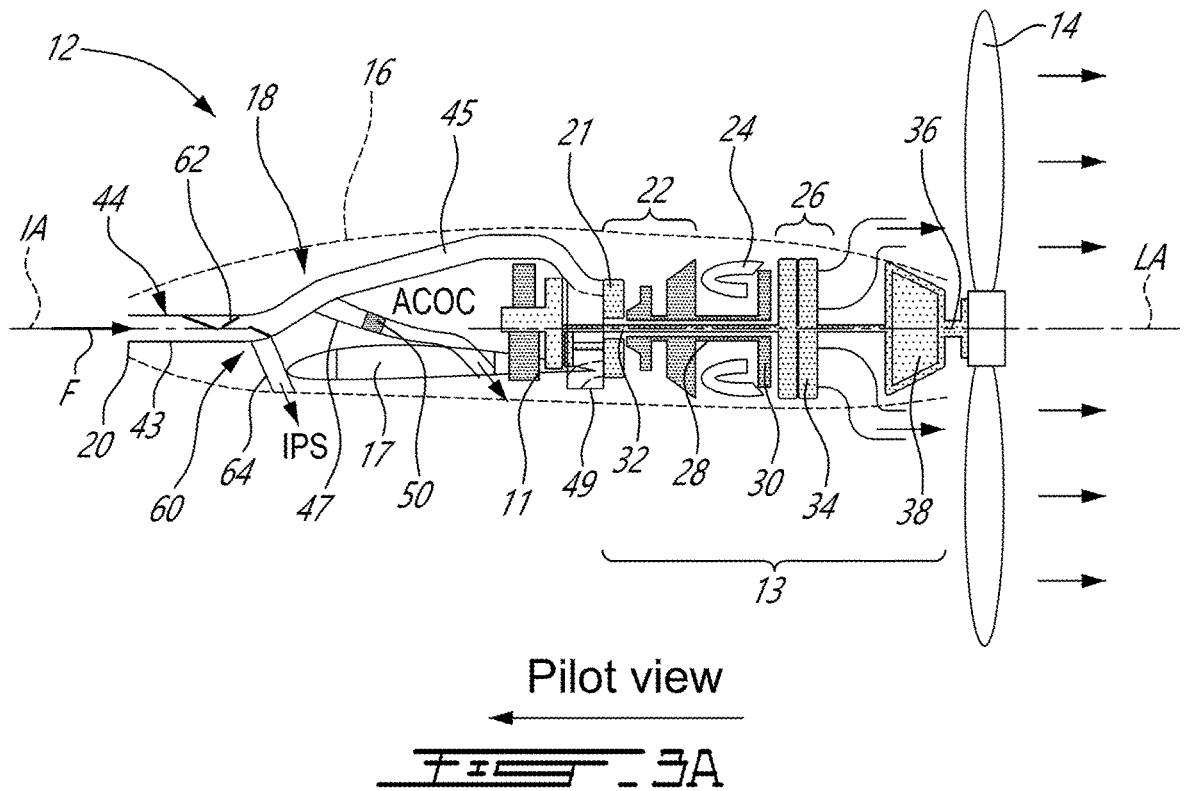
FIG. 3A is a schematic cross-sectional view of a pusher gas turbine engine installation in accordance with an embodiment.

As best seen in FIG. 3A, the pusher engine 12 may be of a type suitable for use in aircraft applications for subsonic flight generally comprising, in serial flow communication, air intake 18 through which ambient air is received, a compressor section 22 (which may be a multistage compressor) for pressurizing the air, a combustor 24 in which the compressed air is mixed with fuel and ignited for generating an annular stream of hot combustion gases, and turbine section 26 (which may be a multistage turbine) for extracting energy from the combustion gases. In various embodiments, gas turbine engine 12 may have a dual-spool configuration but it is understood that gas turbine engine 12 may not be limited to such configuration. For example, gas turbine engine 12 may comprise high-pressure spool 28 including one or more stages of multistage compressor 22 and one or more high-pressure turbines 30 of turbine section 26. Gas turbine engine 12 may also comprise low-pressure spool 32 including one or more stages of multistage compressor 22 and one or more low-pressure (i.e., power) turbines 34 of turbine section 26. Low-pressure spool 32 may be mechanically coupled to output shaft 36 via a reduction gearbox 38, to which the propeller 14 may be coupled.

Figure 3B:
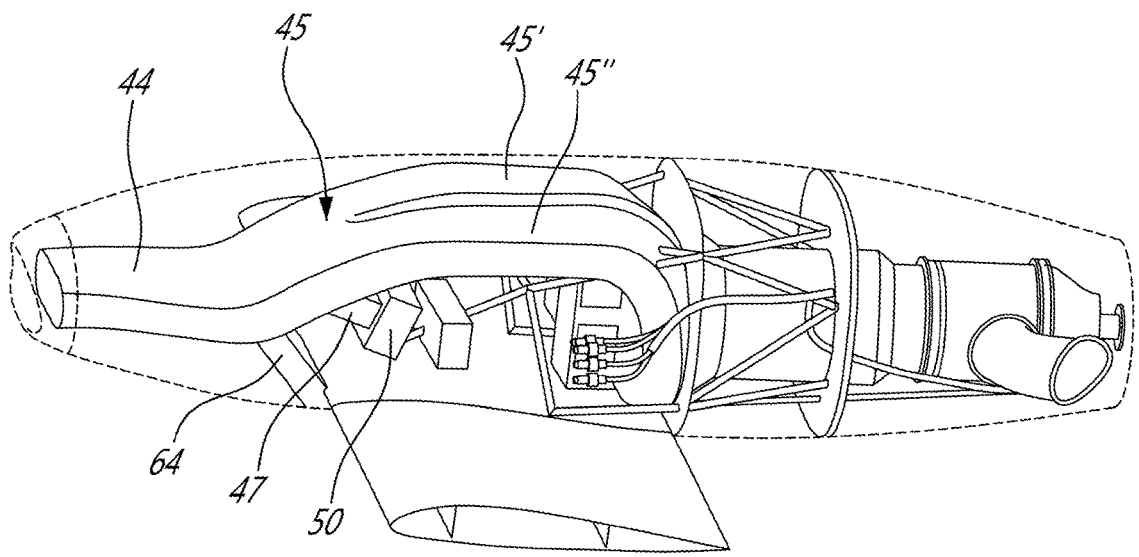
FIG. 3B is a perspective view of the pusher gas turbine engine installation of FIG. 3A, shown mounted to a wing and with a nacelle thereof partially transparent.

Referring still to FIG. 3A, in one particular embodiment the air intake 18 of the pusher engine 12 includes a forward-facing intake inlet 20 receiving the ambient air, and an inlet duct 44 in fluid communication with the intake inlet 20 and extending downstream therefrom. More particularly, the air inlet duct 44 extends from the intake inlet 20 to the engine air inlet 21, such as to provide the main airflow into the core 13 of the engine 12. The air inlet duct 44 includes a first, or upstream, section 43 that extends immediately downstream of the intake inlet 20 and may be, in one particular embodiment, centrally located such that an intake axis IA defined by the intake inlet 20 is substantially concentric with the longitudinal axis LA of the engine 12. A second, or downstream, section 45 of the air inlet duct 44 terminates at the engine air inlet 21. As best seen in FIG. 3B, in one particular embodiment, this second downstream section 45 of the air inlet duct 44 may be bifurcated into two separate ducts 45' and 45". In the embodiment of FIG. 3B, the two separate ducts 45' and 45" are bifurcated relative to a central vertical plane extending through the longitudinal engine axis LA. Accordingly, the outlets of each of these ducts 45' and 45" may thereby direct the inlet airflow into opposite sides of an annual quasi-scroll intake 49 that that feeds the engine air inlet 21. In the embodiment of FIG. 3B, therefore, the downstream duct section 45 is bifurcated, thereby comprising the bifurcated duct portions 45' and 45" which are split at the top-dead-center (TDC) and may thus be located at 11 and 1 o'clock, for example. The bifurcated duct portions 45' and 45" of the downstream duct 45 feed air to the engine air inlet 21 at two circumferential locations, thereby partially wrapping around the annular engine inlet and thus forming a "quasi-scroll" type air inlet duct configuration. This quasi-scroll inlet configuration may contribute to ensuring relatively low losses and enable some ram recovery of the air entering the engine core 13. By integrating the front-facing air inlet 20 and inlet duct 44, and such as quasi-scroll type inlet ducting to the engine air inlet 21, overall engine performance (e.g. specific fuel consumption (SPC)) may accordingly be improved.

As seen in both FIGS. 3A and 3B, an additional air duct 47 (which may also be referred to herein as a "second air outlet duct" or simply as an "oil cooler duct"), directs a portion of the incoming cool air into an air-cooled-oil-cooler (ACOC) 50. In the depicted embodiment, the ACOC air duct 47 is fluidly connected to the air inlet duct 44 at a point thereon between the first, upstream, section 43, and the second, downstream, section 45. This connection point may also be located over the wing 17 and downstream (and axially aft) of an inertial particle separator duct 42, as will be described in further detail below. More particularly, between the intake inlet 20 and the engine air inlet 21, a portion of the airflow within the main air inlet duct 44 is diverted away into the ACOC inlet duct 47. The air intake 18 therefore includes two separate outlet ducts, namely the main air inlet flow within the downstream duct section 45 of the air inlet duct 44, which directs a portion of the inlet airflow into the core 13 of the engine 12, and the ACOC air duct 47, which directs another portion of the incoming air into an air-cooled-oil-cooler (ACOC) 50. The portion of the inlet airflow directed to the engine core may be a major or majority portion of the incoming airflow, and the portion of the airflow directed into the ACOC 50 may be a small portion of the total incoming airflow. As such, the air duct 47 directs a portion of the air flowing through the inlet duct 44 to the ACOC 50, and a remaining portion of the incoming air is directed through the downstream duct portion 45 to the engine core air inlet 21.

The ACOC 50 may be located in-line within the ACOC air duct 47. The ACOC 50 is used to cool engine oil, by transferring the heat from the engine oil to the cooler air flowing through the second outlet duct 47. After flowing through the ACOC 50, the air (by then heated by the ACOC) can flow out of the second outlet duct 47 for ejection—either externally to atmosphere or within the nacelle 16—or re-use for other purposes (e.g. ant-icing over nacelle or engine components.

Accordingly, as described above and shown in FIG. 3A, air inters the air intake 18 through the common inlet duct 44, and at a point located downstream of the intake inlet 20 splits into the main engine downstream duct portion 45 and the ACOC air inlet duct 47, in order to feed incoming air into the engine core 13 and to the ACOC 50, respectively. As shown, in this embodiment, the second outlet duct 47 and the ACOC 50 that is fed by it are both located axially forward of the engine core 13 of the engine 12, but may be substantially aligned therewith (relative to the axis LA) such as to produce an overall relative "long and thin" envelope for the nacelle 16, which therefore has a relatively long forward "snout". As seen in FIG. 3A, the ACOC 50 and the air duct 47 feeding it may be axially located in line (or overtop of) the wings 17 of the aircraft, with the majority of the engine 12 and/or the center of the mass of the engine 12 being located axially after of the wings 17.

As shown in FIG. 3A and FIG. 3B, the first, most upstream, section 43 of the inlet duct 44 of the air intake 18 is centrally located within the nacelle 16 relative to the engine centerline LA. As such, intake axis IA of the first section 43 of the inlet duct 44 may be substantially coaxial with the main engine axis LA, as seen in FIGS. 3A and 3B. The downstream duct section 45, and thus the bifurcated duct portions 45' and 45", may however be radially offset from the inlet duct 44 and thus the intake axis IA, extending up and radially outward (over the accessory gear box 11 which is also axially aligned with the engine axis LA in order to maintain a slim radial envelope) before redirecting radially inward to the engine air inlet 21.

Given that the turboprop engine 12 is a pusher engine with the propeller 14 located aft of the engine core 13 and having a front-facing air inlet 20, the possible effect of foreign object damage (FOD) caused by particles (e.g. ice, debris, etc.) in the incoming air should be considered. Accordingly, as seen in FIG. 3A, the air intake 18 also optionally includes an inertial particle separator (or "IPS") 60. The IPS 60 is located upstream, and axially forward, of the engine air inlet 21, so as to prevent ingestion of ice, other particles and/or other FOD-causing objects into the engine. The terms "particles" or simply "FOD" may be used herein to describe generally all of such FOD particles/objects, even though it will be understood that in some cases the FOD-causing objects in question may be significantly larger than an ice or other particle per se—such as a bird or other airborne object for example that could be unintentionally ingested into the engine's air intake. In the embodiment of FIG. 3A, the IPS 60 is also located upstream, and axially forward, of the ACOC 50. More particularly, the IPS 60 includes an IPS duct 64 that is fluidly connected with the upstream section 43 of the air inlet duct 44, and a FOD particle separator that is capable of separating FOD particles from the incoming airflow and re-directing them into the IPS duct 64. Accordingly, such undesirable FOD particles prevented from flowing unhindered downstream, through the air inlet duct 44 and thus into the air inlet of the engine 12.

In the embodiment of FIG. 3A, the IPS 60 includes a one or more FOD-deflectors, or FOD-diverters, that extend at least partially into the air inlet duct and act to redirect any FOD into the IPS duct 64. In one particular embodiment, the FOD-deflectors comprise one or more FOD-diverting plates 62 (or simply "plates" hereinbelow) which project into the upstream section 43 of the air inlet duct 44, at a location upstream of the IPS duct 64. The FOD diverting plates 62, which in the depicted embodiment include three plates however fewer or more plates may alternately be used, may be either stationary or movable such as to be adjusted into a desired position relative to one another and relative to the incoming airflow through the inlet duct 44. In one particularly embodiment, wherein at least one plate 62 is movable, the plate is displaceable between a deployed position and a retracted position. In the deployed position, the plate will protrude into the air inlet duct to redirect FOD. In the retracted position, the plate is substantially withdrawn from the airflow through the air inlet duct and will therefor generate less flow restriction. It is to be understood that in some embodiments, the moveable plate may be positioned not just at these two end points of its travel, i.e. at the fully retracted and fully deployed position, but may also be positioned a number of possible intermediate positions between these two extremes. In the depicted embodiment, each of the three plates 62 may be independent movable, and each may comprise either a two-state active control (e.g. being either deployed or retracted, as needed) or a fully variable active control whereby any desired angular position of each of the plates can be selected as required.

Regardless of whether they are fixed or movable, the plates 62 are positioned such as to divert any potential FOD-causing particles that might enter the inlet duct 44 into the IPS duct 64, for subsequent discharge overboard. Unwanted FOD-causing particles are therefore diverted into the IPS duct 64, and prevented from flowing further downstream and thus from being ingested into the engine air inlet 21 or the ACOC 50. In one particular embodiment, a plurality of plates 62 are provided and extend into the air inlet duct 44, with at least a first one of the plurality of plates extending away from an inner wall of the air inlet duct in a downstream direction, and at least a second one of the plurality of plates extending from an inner wall of the air inlet duct in an upstream direction. In some embodiments, the plate which is more downstream within the air inlet duct will be the one which extends in the upstream direction away from the wall of the air inlet duct. These first and second ones of the plates may be mounted to the same inner wall of the air inlet duct, or may be located on opposite sides from each other with the duct.

The IPS duct 64 may therefore be integrated with the inlet duct 44, and it projects away therefrom downward and radially away from the inlet axis IA. As can be appreciated from FIG. 3A, the IPS duct 64 in this embodiment is separate and distinct from, and located upstream of, the second outlet duct 47 feeding air to the ACOC 50. The IPS duct 64 may thus be axially located forward of the wing 17 of the aircraft, such as to expel any unwanted FOD particles outboard and away from the aerodynamic surfaces of the wings 17. The second outlet duct 44 and the ACOC 50, in this embodiment, are axially positioned over the wing 17, with the engine core 13 of the gas turbine engine 12 being located substantially rearward of the wing 17.

Several other embodiments of the present air intakes will now be described. Unless otherwise indicated, the features of each of the following engines and their respective air inlets will be similar to those of the pusher engine 12 and the air inlet 118 as described above. Only the differences will be described in more detail below, for the avoidance of repetition.

Figure 4A:
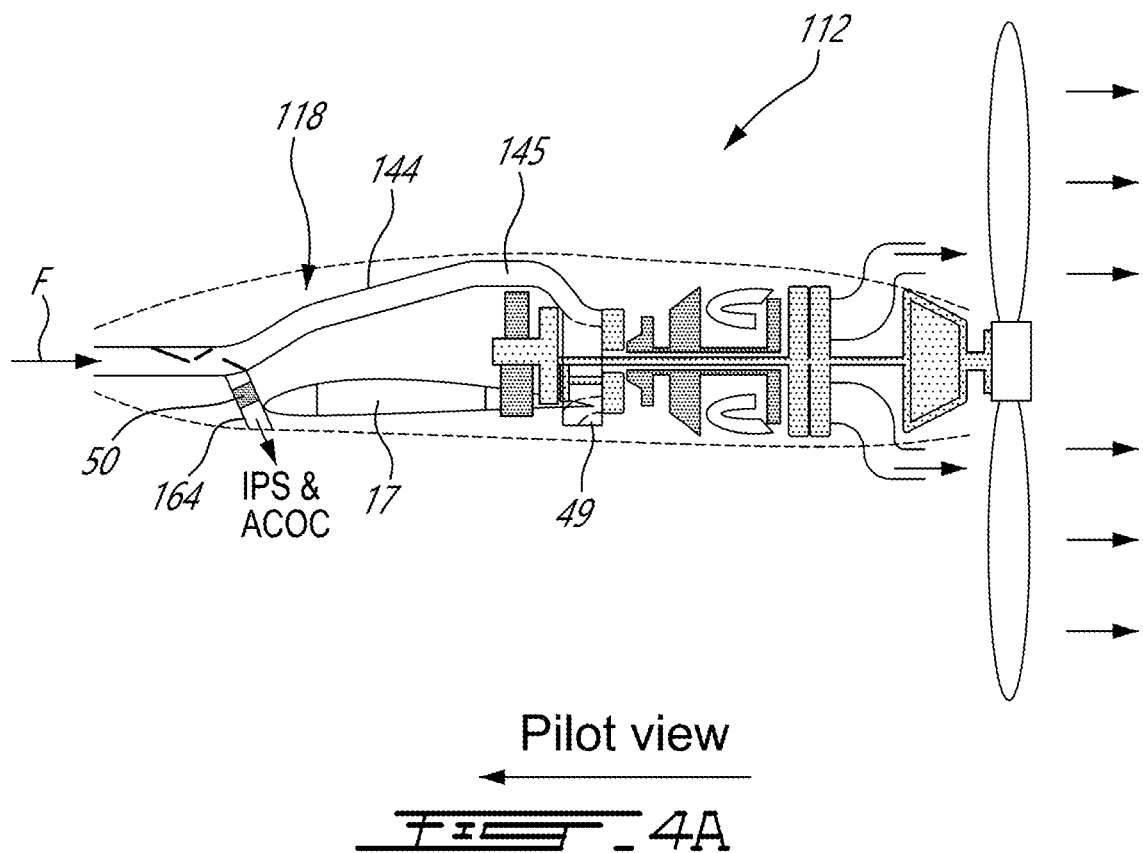
FIG. 4A is a schematic cross-sectional view of a pusher gas turbine engine installation in accordance with an embodiment.
Figure 4B:
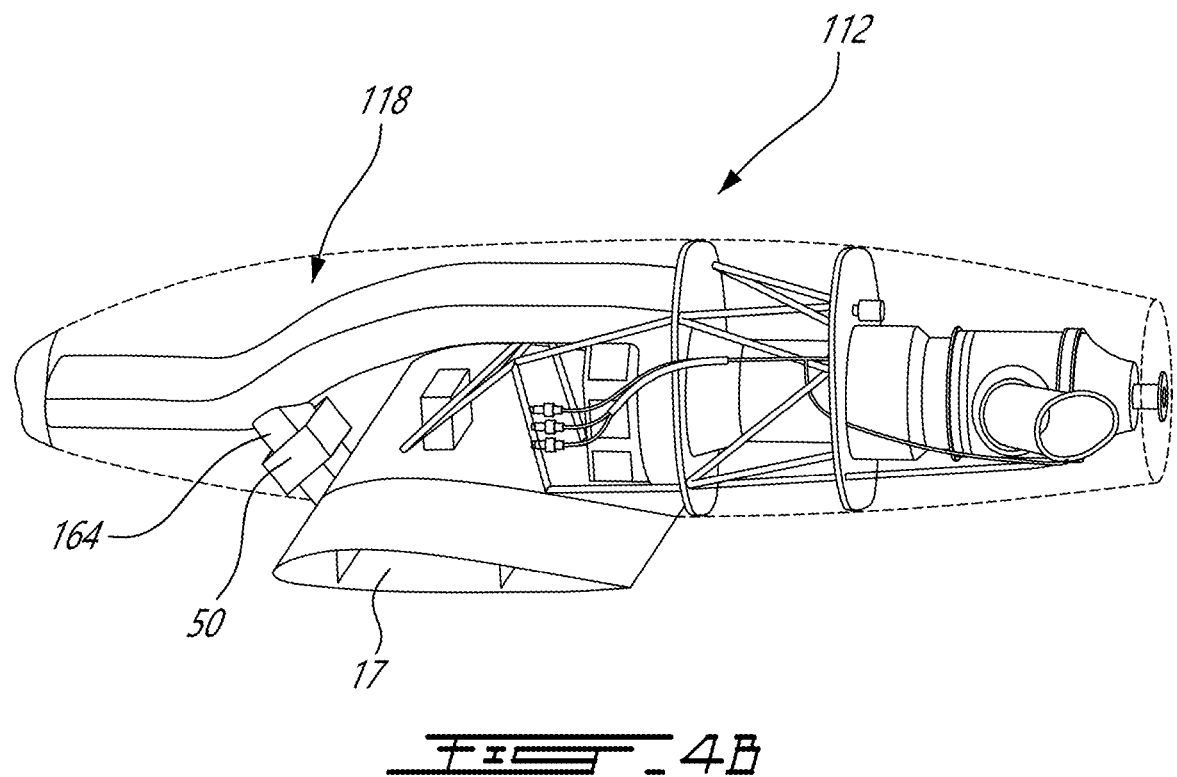
FIG. 4B is a perspective view of the pusher gas turbine engine installation of FIG. 4A, shown mounted to a wing and with a nacelle thereof partially transparent.

Referring now to the embodiment of FIG. 4A-4B, the pusher engine 112 includes an air intake 118 in which the IPS duct and the ACOC duct are integrated into a single air duct 164, which is connected to the main air inlet duct 144 such as to divert a portion of the flow therethrough. More particularly, the IPS duct 164 of the present air intake configuration includes the ACOC 50 therein, thereby avoiding the need for an additional air duct exclusively for the ACOC. The combined IPS and ACOC duct 164 is located forward of the wing 17 of the aircraft.

Additionally, unlike the air inlet duct 44 described above, the air inlet duct 144 is not bifurcated at TDC, as can be best seen in FIG. 4B. The downstream section 145 of the air inlet duct 144 therefore connects to the engine air inlet quasi-scroll 49 at a single location, for example at TDC. The engine air inlet is therefore a single inlet, quasi-scroll configuration.

Figure 5A:
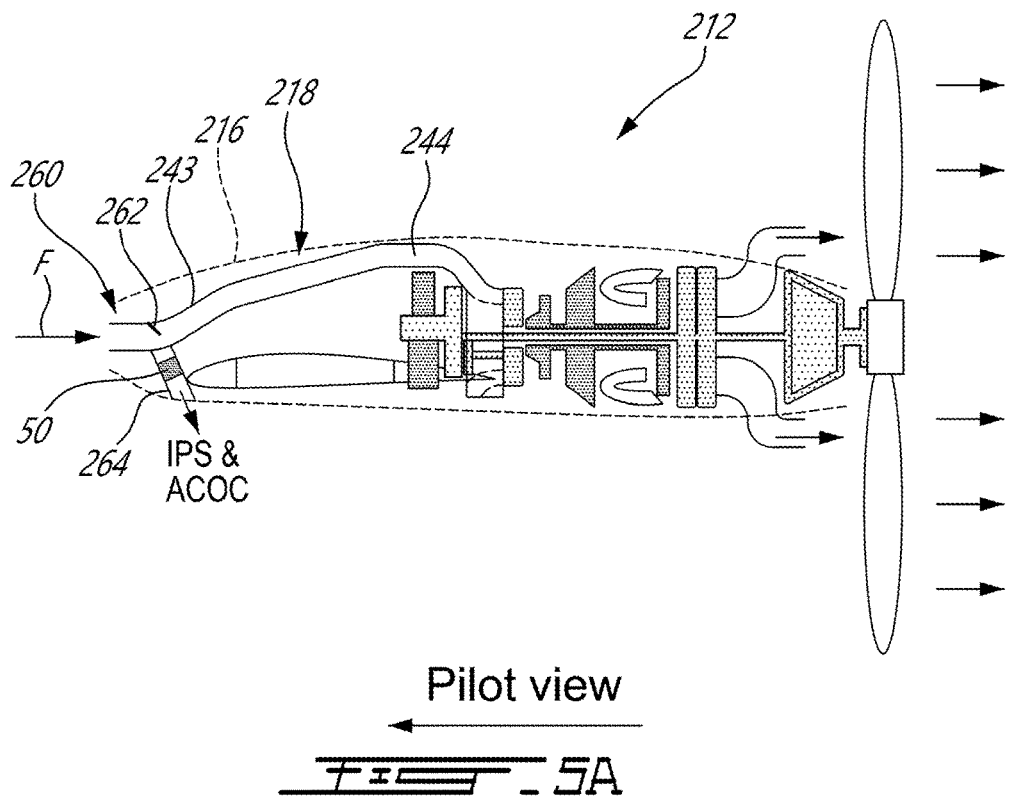
FIG. 5A is a schematic cross-sectional view of a pusher gas turbine engine installation in accordance with an embodiment.
Figure 5B:
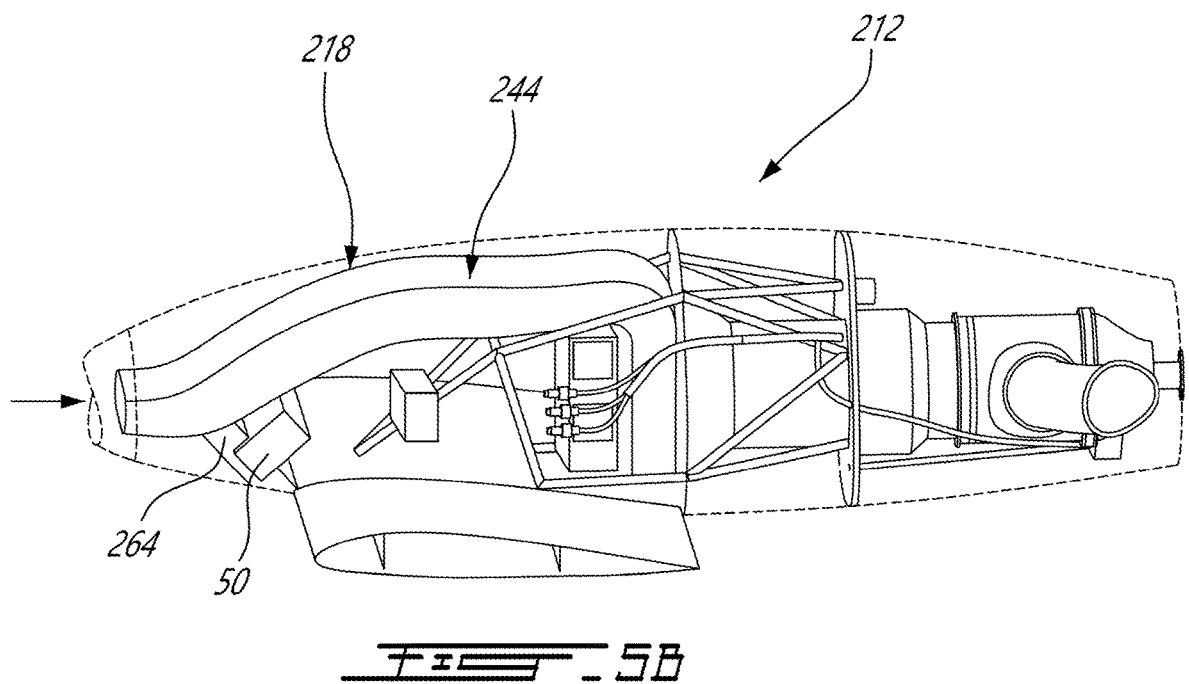
FIG. 5B is a perspective view of the pusher gas turbine engine installation of FIG. 5A, shown mounted to a wing and with a nacelle thereof partially transparent.

Referring now to the embodiment of FIG. 5A-5B, the pusher engine 212 includes an air intake 218 which is formed such that the overall axial length of the nacelle 216 required is shorter than that of the engines 12 and 112, thereby providing a so-called "medium snout" nacelle design, as opposed to the longer nacelle snouts of engines 12, 112. Much as per the air intake 118, the air intake 218 includes an integrated IPS and ACOC duct 264 that includes the ACOC 50. In this embodiment, however, the IPS 260 employs one or more fixed elements projecting into the upstream portion 243 of the main air inlet duct 244. For example, the one or more fixed elements may include a fixed icing screen, which will capture ice particles within the incoming airflow. The fixed icing screen 262 may be part of a two state, passive system, rather than the active systems of the movable plates 62 described above.

Inlet screens as described herein may comprise a metallic screen acts in operation to substantially prevent foreign objects (e.g., pieces of ice) larger than a certain size from exiting intake outlet. The screen(s) may also serve as a surface on which ice is permitted to accrete, thereby preventing or reducing the likelihood of ice accreting further downstream into gas turbine engine.

Figure 6:
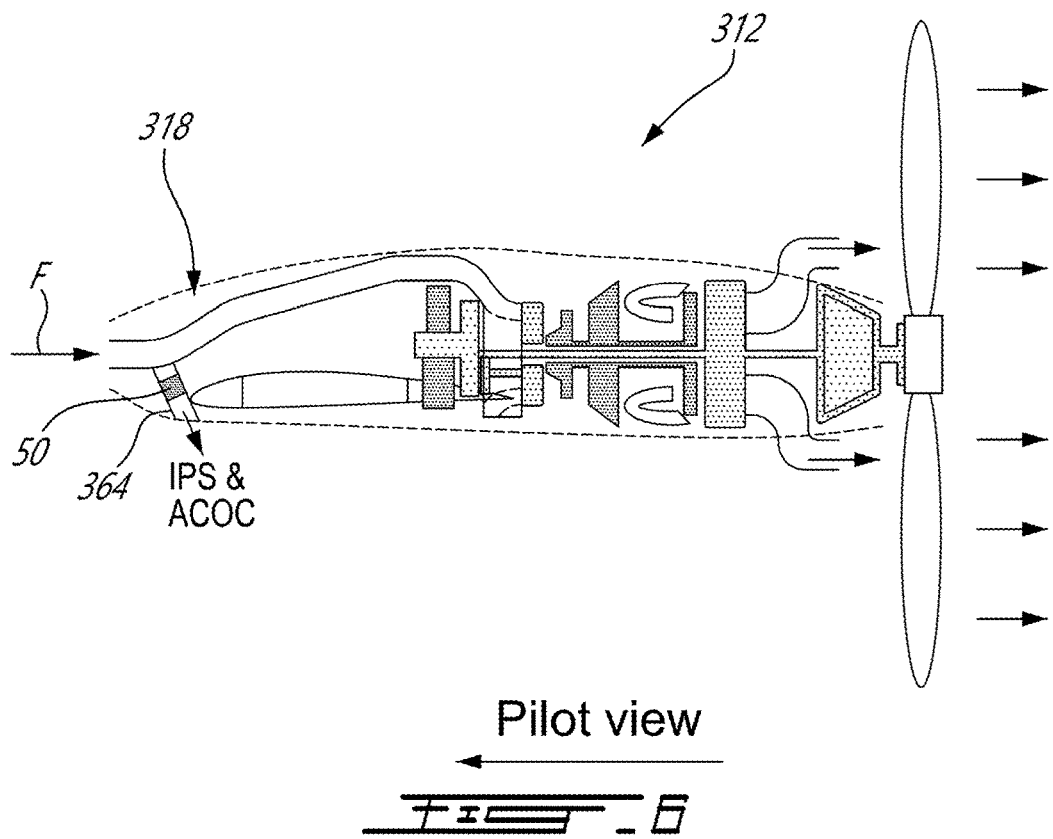
FIG. 6 is a schematic cross-sectional view of a pusher gas turbine engine installation in accordance with an embodiment.

Referring now to the embodiment of FIG. 6, the pusher engine 312 includes an air intake 318 which is even further simplified, in that it includes no fixed icing screen or other projecting plates as part of an IPS. Much as per the air intakes 118 and 218, the air intake 318 similarly includes an integrated IPS and ACOC duct 364 that includes the ACOC 50.

Figure 7:
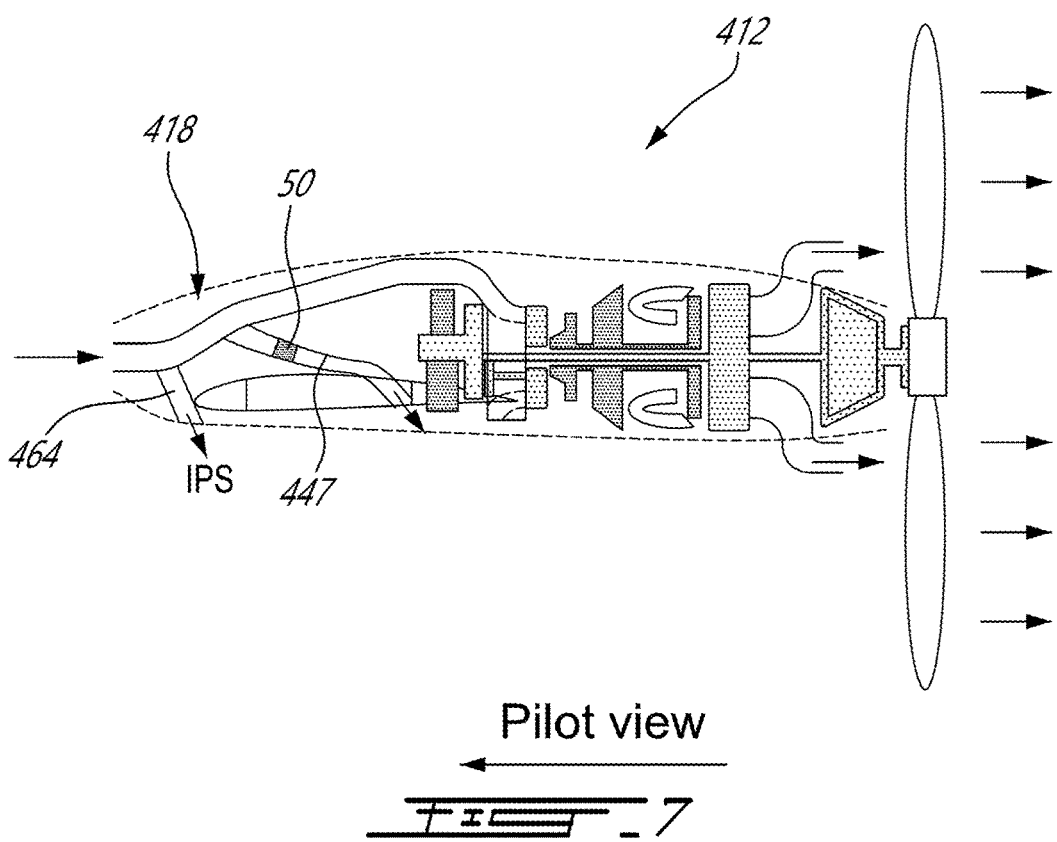
FIG. 7 is a schematic cross-sectional view of a pusher gas turbine engine installation in accordance with an embodiment.

Referring now to the embodiment of FIG. 7, the pusher engine 412 includes an air intake 418 which is similar to that of air intake 18 described above, in that it includes a separate IPS duct 464 and ACOC duct 447. In this embodiment, however, no IPS plates or other icing screens (fixed or otherwise) are provided as part of an IPS system.

Figure 8:
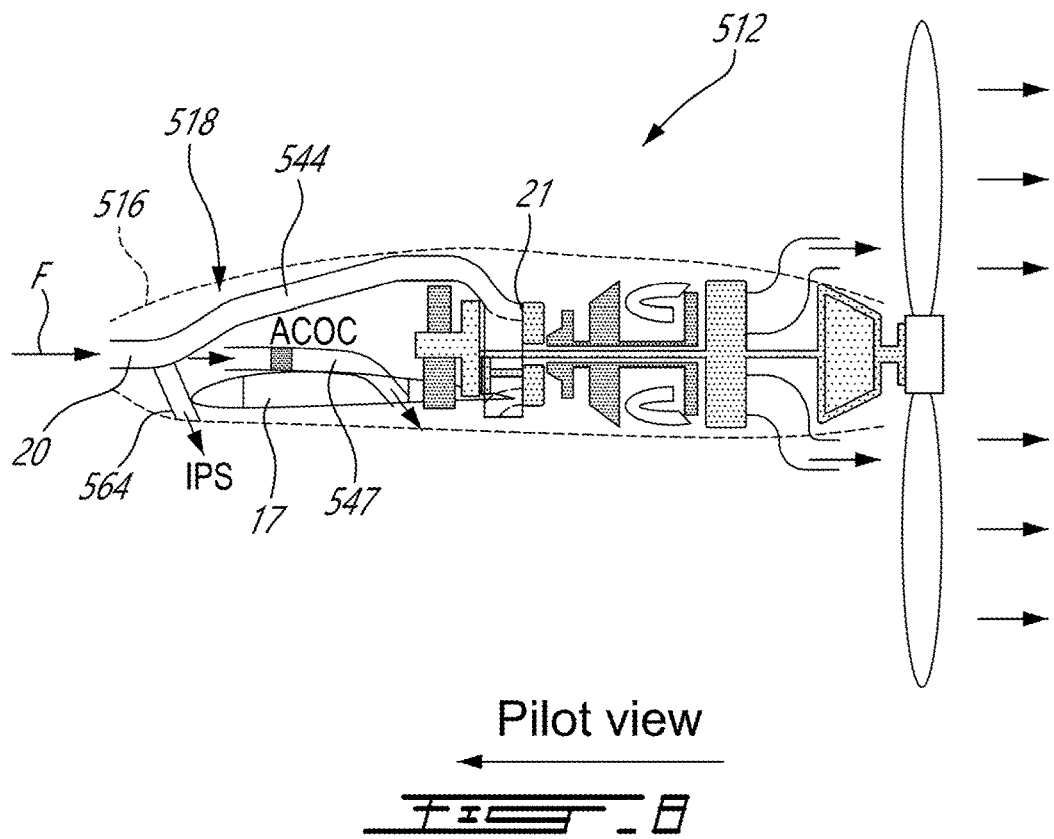
FIG. 8 is a schematic cross-sectional view of a pusher gas turbine engine installation in accordance with an embodiment.

Referring now to the embodiment of FIG. 8, the pusher engine 512 includes an air intake 518 that includes both an IPS duct 564 and an ACOC duct 547. However, in this embodiment, the ACOC duct 547 is not integrated with or connected directly to the main air inlet duct 544 feeding the air to the engine core. Rather, the ACOC duct 547 containing the ACOC 50 is mounted separately within the nacelle 516, over the wing 17, and receives incoming airflow from air flowing through the nacelle 16. In other words, the air directed through the ACOC duct 547 is not air which is diverted off from the main air inlet flow to the engine core. All of the air entering the front-facing air inlet 20 is therefore directed through the air inlet duct 544 to the engine air inlet 21.

Figure 9:
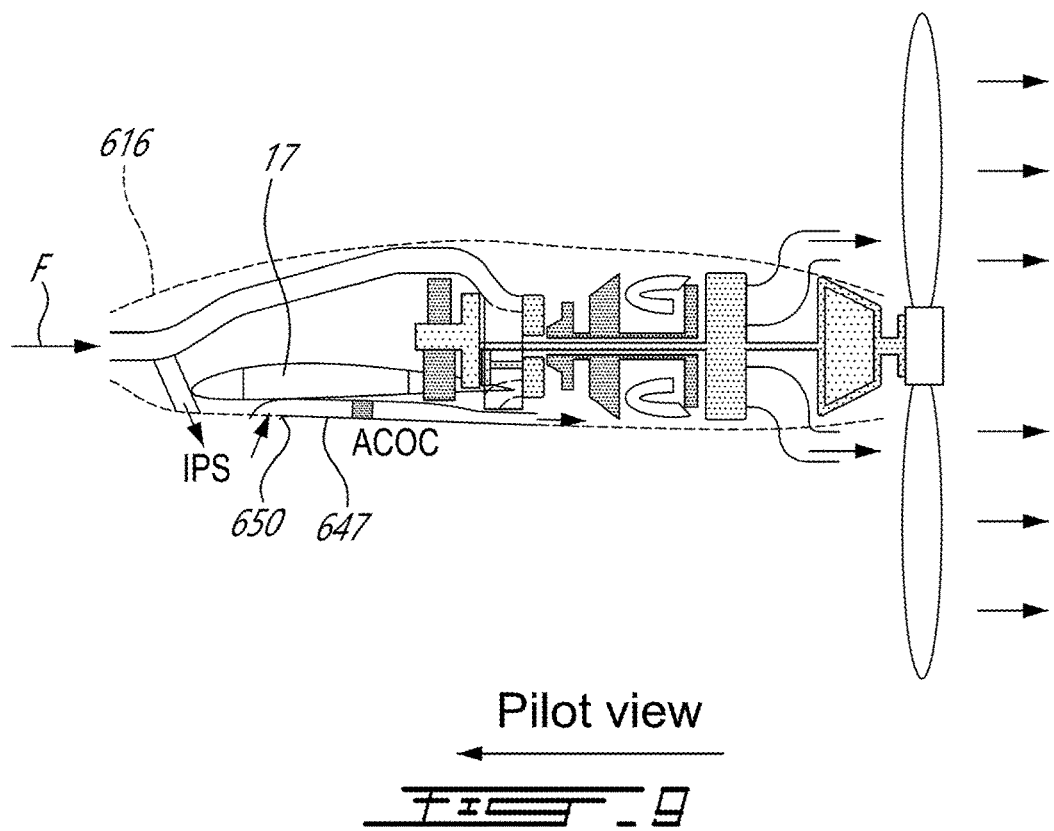
FIG. 9 is a schematic cross-sectional view of a pusher gas turbine engine installation in accordance with an embodiment.

FIG. 9 depicts another embodiment, similar to that of FIG. 8, except wherein the ACOC duct 647 is mounted below the wing 17, instead of above it. As such, the air directed through the ACOC duct 647 can be drawn from outside the nacelle 616 through inlet 650. However, in an alternate embodiment, the inlet 650 of the ACOC duct 647 may still be located such as to dawn air from outside the nacelle 616, however with the ACOC duct 647 located elsewhere within the nacelle.

Figure 10:
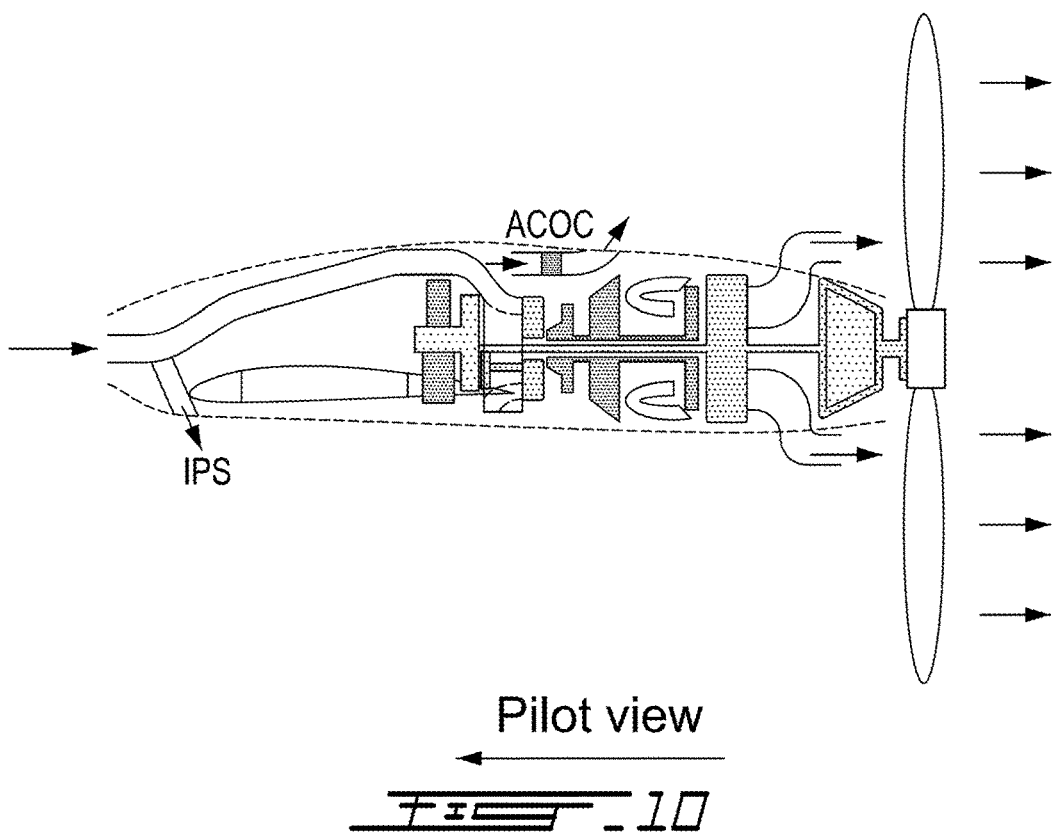
FIG. 10 is a schematic cross-sectional view of a pusher gas turbine engine installation in accordance with an embodiment.
Figure 11:
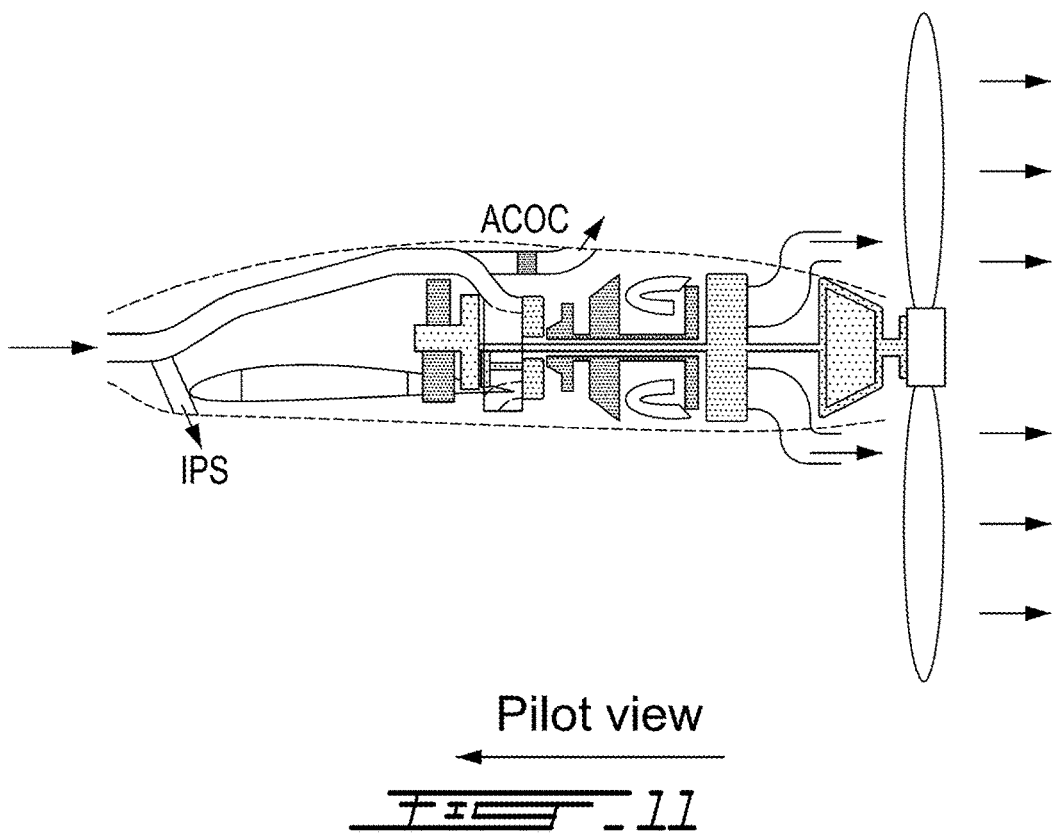
FIG. 11 is a schematic cross-sectional view of a pusher gas turbine engine installation in accordance with an embodiment.
Figure 12:
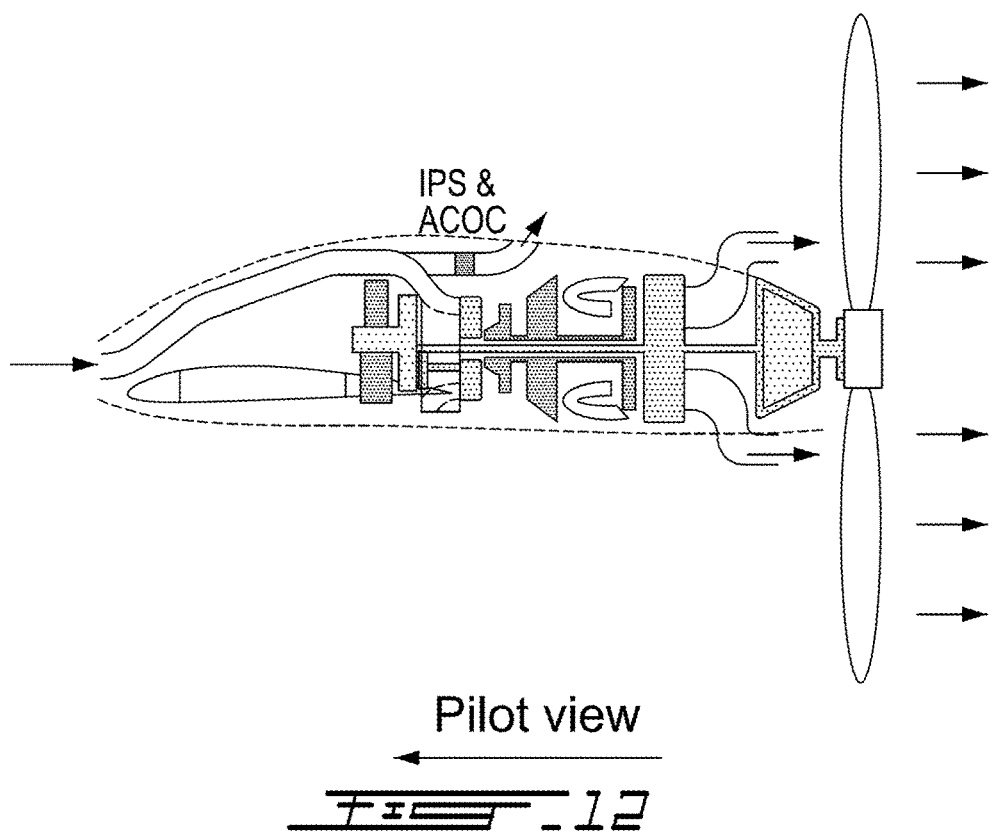
FIG. 12 is a schematic cross-sectional view of a pusher gas turbine engine installation in accordance with an embodiment.

FIGS. 10-12 depict alternate embodiments, wherein the ACOC duct is disposed in other locations within the nacelle, generally aft of the wing of the aircraft. The ACOC duct may similarly be separate from (FIGS. 10 and 11) or integrated with (FIG. 12) the IPS duct.

Figure 13:
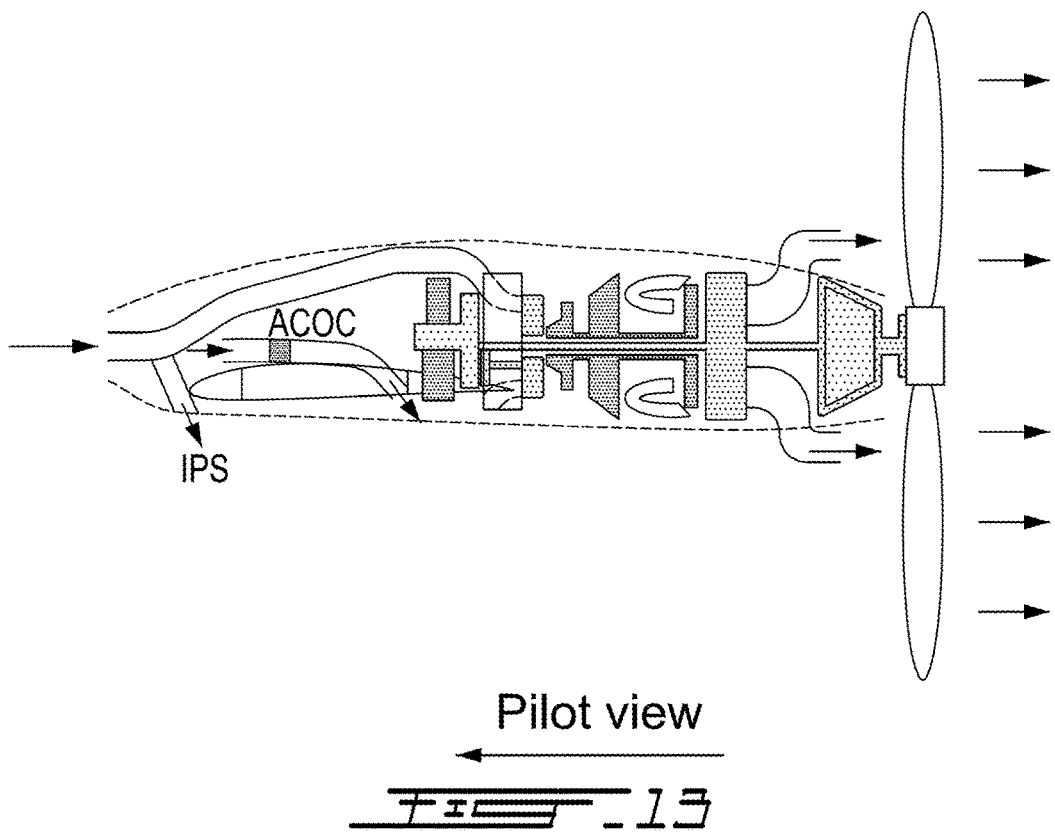
FIG. 13 is a schematic cross-sectional view of a pusher gas turbine engine installation in accordance with an embodiment.

FIG. 13 depicts an alternate embodiment, similar to that of FIG. 8, except having an air inlet plenum (or "dump box") at the engine air inlet, rather than the quasi-scroll air inlet configuration.

Figure 14:
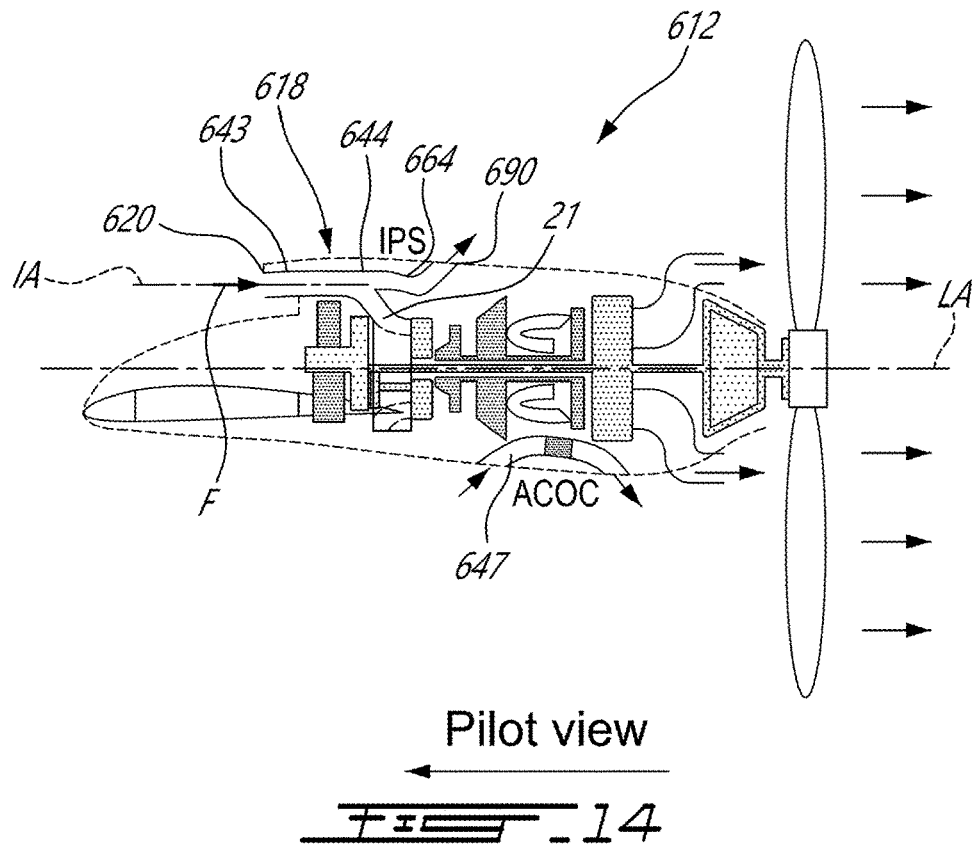
FIG. 14 is a schematic cross-sectional view of a pusher gas turbine engine installation in accordance with an embodiment.

Referring now to the embodiment of FIG. 14, the pusher engine 612 includes an air intake 618 that includes an IPS duct 664 that and an ACOC duct 647. The IPS duct 64 is fluidly connected with the upstream section 643 of the air inlet duct 644, and a FOD particle separator that is capable of separating FOD particles from the incoming airflow and re-directing them into the IPS duct 664, for ejection overboard at 690. Accordingly, such undesirable FOD particles are prevented from flowing unhindered downstream, through the air inlet duct 644 and thus into the air inlet 21 of the engine 612.

In this embodiment, the air intake 620 and the upstream section 643 of the air intake 618 is located near the upper portion of the nacelle, and is not axially aligned with the engine. More particularly, the air intake 618 of the upstream section 643 of the air inlet duct 618 defines an intake axis IA that is radially offset (parallel to and spaced apart) from the from the main engine axis LA, as can be seen in FIG. 14.

As can also be seen in FIG. 14, in this embodiment the ACOC duct 647 is split apart from the IPS duct 664 and the rest of the air inlet duct 644 of the air intake 618. The ACOC duct 647 is located, in this embodiment, below the engine core, and draws air directly from outside the engine and/or outside the nacelle, for feeding through the ACOC in the ACOC duct 647. Accordingly, the airflow used to cool the ACOC, which flows through the ACOC duct 647, is independent from the airflow through the air intake 618, which feeds the engine.

Figure 15:
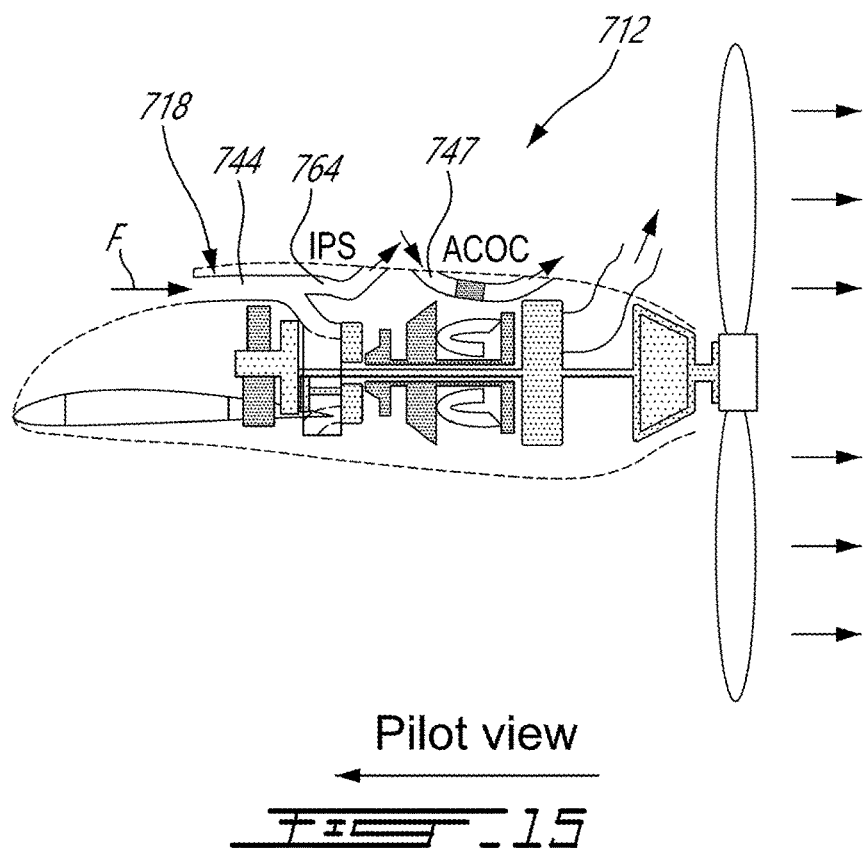
FIG. 15 is a schematic cross-sectional view of a pusher gas turbine engine installation in accordance with an embodiment.

FIG. 15 depicts an alternate embodiment, similar to that of FIG. 14, having an ACOC duct 747 that is split apart from the IPS duct 764 and the rest of the air inlet duct 744 of the air intake 718. In this embodiment, however, the ACOC duct 747 is located above the engine core, rather than below, and is axially located rearward of the IPS duct 764 and the air intake 718. Nevertheless, the airflow feeds to the air intake 718 and the ACOC duct 747 are separate, and each draws ambient air in from different external inlets in the nacelle.

In various embodiments, the air intake may channel the flow of ambient air (represented by the arrow F in the figures) toward engine inlet of gas turbine engine. The engine inlet may have a substantially annular shape and may be disposed upstream of compressor 22 of the engine. For the purpose of description and reference with the figures, the air intake may define an intake axis IA, which in certain embodiments may be substantially coaxial with annular engine inlet and/or substantially coaxial with longitudinal axis LA (e.g., center line) of gas turbine engine when air intake is installed on gas turbine engine. The engine inlet may comprise an annular opening into which the flow of air discharged substantially axially rearwardly from intake outlet. In some embodiments, the annular engine inlet may be coaxial with longitudinal axis LA of gas turbine engine. In some embodiments, the longitudinal axis LA of gas turbine engine may correspond to the axis or rotation of high-pressure spool 28 and of low-pressure spool 32 as shown in FIG. 3A. Accordingly, in embodiments where an axis of rotation of propeller 14 is radially offset from an axis of rotation of high-pressure spool 28 and low-pressure spool 32, the longitudinal axis LA may not necessarily correspond to the axis of rotation of propeller 14. In various embodiments, the intake axis IA may be either substantially coaxial the longitudinal axis LA, or may be offset therefrom (e.g. spaced apart therefrom in a radial or transverse direction from the longitudinal axis).

The annual quasi-scroll intake 49 that that feeds the engine air inlet 21, as described above with reference to FIG. 3A, may be in fluid communication with intake duct 44 and receive the flow of air F from intake duct 44. A scroll portion of the quasi-scroll intake 49 may channel the flow of air F toward engine inlet via the intake outlet. The scroll portion may define one or more converging quasi scroll-shaped passages formed such as to cause acceleration and redirection of the flow of air F toward engine inlet with relatively low energy losses and pressure distortion.

During operation, the present air intakes may be installed on gas turbine engine and used to channel a flow of air to engine inlet with relatively low energy losses and flow distortion (e.g., swirl and pressure distortions). Air intake may define a generally streamlined flow path between intake inlet and the intake outlet. For example, in some embodiments, air intake may not comprise a plenum (i.e., dump box) often found in traditional air intakes and which may cause significant energy losses. In various embodiments, improvements of flow characteristics of the flow or air F may improve engine performance in comparison with some other traditional air intakes.

In various embodiments, the air intakes as described herein may be fabricated according to known or other manufacturing methods using suitable sheet metal or polymeric material. In some embodiments, air intake or part(s) thereof may be cast using a suitable metallic material or molded from a suitable polymeric material. In some embodiments, air intake may comprise a plurality of components (e.g., pieces of sheet metal) pieced (e.g., welded) together to form air intake.

Referring now to FIG. 16, in the embodiment shown, an accessory gearbox 11 is in driving engagement with the low-pressure spool 32 (FIG. 3A) of the engine 12. The accessory gearbox (AGB) 11 defines at least one, three in the embodiment shown, outputs 11a for accessories (not shown) to be drivingly engaged to the low-pressure spool 32 via the accessory gearbox 11. As shown, the outputs 11a face a direction having a radial component relative to the longitudinal axis LA of the engine core 13. The accessories connected to the outputs 11a are herein located radially between the nacelle 16 and the outputs 11a. In other words, the disclosed pusher engine 12 allows the accessories to be located radially outwardly of the gearbox 11 and radially inwardly of the nacelle 16 relative to the axis LA. Consequently, an access door 16a of the nacelle 16 may allow easy access via an opening 16b defined through the nacelle 16 to replace, repair, and perform maintenance of the accessories without having to dismantle the pusher engine 12.

Still referring to FIG. 16, a mounting structure M is used to secure the engine core 13 to the wing 17. The mounting structure includes a frame 100. The frame 100 is herein secured to both of fore and aft spars 17a, 17b of the wing 17. The fore and aft spars 17a, 17b are structural members that extend in a spanwise direction along a spanwise axis SA of the wing 17, from a root of the wing 17 to a tip thereof. The fore spar 17a is located proximate a leading edge of the wing 17 whereas the aft spar 17b is located proximate a trailing edge of the wing 17.

In the embodiment shown, the frame 100 includes a plurality of members 100a that are secured to one another. The members 100a are assembled to define an engine-receiving space S sized to contain the engine core 13 and the AGB 11. The members 100a may be tubular members.

However, having a side mounted accessory gearbox 11, with side mounted accessories, might complicate installation of the engine core 13 and AGB 11 on the wing 17 as a radial dimension of the engine core 13 with the AGB 11 might be too big to allow the pusher engine 12 to be inserted in the engine-receiving space S by moving said engine 12 along its axis LA. Some of the frame members 100a may prevent penetration of the engine core 13 and AGB 11 into the engine-receiving space S if the engine and AGB 13, 11 are moved axially along the longitudinal axis LA.

Referring now to FIGS. 16 and 17, the engine core 13 is installed by moving said engine core in a vertical direction VD relative to a ground G. The vertical direction may correspond to a radial direction relative to the longitudinal axis LA of the engine core 13. In the embodiment shown, the engine core 13 is inserted in the desired position by decreasing an elevation of the engine core 13 relative to the ground G. In other words, the engine core 13 is lowered into the desired position into the engine-receiving space S by bringing the engine core 13 closer to the ground G.

In the depicted embodiment, the frame 100 has an upper frame portion 100b and a lower frame portion 100c both including some of the tubular members 100a. As shown more clearly on FIG. 16, the mounting structure M further includes a mount ring 102 for connecting the engine core 13 to the frame 100. Each of the upper and lower frame portions 100b, 100c is secured to a respective one of upper and lower U-shaped mounts 102a, 102b of the mount ring 102. The U-shaped mounts are also referred to as horseshoe-shaped mount. Both of the U-shaped mounts 102a, 102b have a U-shape circumferentially extending around the engine core 13 relative to the longitudinal axis LA. The lower frame portion 100c and the lower U-shaped mount 102b are secured to the wing 17 via the fore and aft spars 17a, 17b whereas the upper frame portion 100b and the upper U-shaped mount 102a are secured to the engine core 13 prior to moving the engine core 13 in the desired position. The lower U-shaped mount 102b defines an opening O oriented away from the ground G when the aircraft is on the ground G. The upper and lower frame portions 100b, 100c may be securable to one another and the upper and lower U-shaped mounts 102a, 102b may be securable to one another once the engine core 13 and AGB 11 are in the desired position, within the engine-receiving space S.

The engine core 13 includes a plurality of pads 13a that are circumferentially distributed around the longitudinal axis LA. The pads 13a are herein secured to a gas generator case 13b of the engine core 13. The gas generator case 13b is a case that surrounds the combustor 24 of the engine core 13. It will be appreciated that the pads 13a may be secured to the compressor case and/or to the turbine-exhaust case. The engine core 13 may be secured to the U-shaped mounts 102a, 102b and the frame 100 via any suitable case of the engine core 13. Elastomeric material may be located between the upper and lower U-shaped mounts 102a, 102b and the pads 13a for dampening vibrations occurring with operation of the gas turbine engine 12.

Referring to FIGS. 16 and 17, for mounting the gas turbine engine 12 to the wing 17 of the aircraft 10, the mounting structure S is secured to the wing 17 of the aircraft 10; the engine core 13 is inserted within the engine-receiving space S by changing the elevation of the engine core 13 relative to the ground G until the engine core 13 is at least partially enclosed by the lower U-shaped mount 102b; and the engine core 13 is secured to the lower U-shaped mount 102b.

In the present case, the lower frame portion 100c is secured to the wing 17; the lower U-shaped mount 102b is secured to the lower frame portion 100c; the upper frame portion 100b and the upper U-shaped mount 102a are secured to the engine core 13; and the engine core 13 is inserted into the engine-receiving space S by moving the engine core 13 in the vertical direction VD toward the ground G until the engine core 13 is received within the lower U-shaped mount 102b via its opening O facing away from the ground G. The upper and lower U-shaped mounts 102a, 102b may be secured to one another and the upper and lower frame portions 100c, 100d, may be secured to one another.

Referring to now to FIG. 19, in an alternate embodiment, the mounting structure includes only one U-shaped mount 104 defining an opening O' facing toward the ground G. The engine core 13 is receivable within the engine-receiving space S in an upward direction away from the ground G.

As shown in FIG. 19, for mounting the engine core 13 to the wing 17, the engine core 13 is elevated away from the ground G until the engine core 13 is at least partially enclosed by the U-shaped mount 104. At which point, the engine core 13 is secured to the U-shaped mount 104 via the pads 13a secured to the gas generator case 13b.

In the embodiment shown, the engine core 13 may be inserted in the engine-receiving space S without having to mount any frame portion thereto. In other words, a frame may include only a single portion that is secured to the wing 17 via the spars 17a, 17b and the horseshoe-shaped mount 104 is secured to the frame before installing the engine core 13. After the engine core 13 is inserted in the engine-receiving space S, the engine core 13 is secured to the U-shaped mount 104 via the pads 13a.

Referring to FIGS. 16-18, after the engine core 13 is at the desired position, the air inlet 18 and other components such as the nacelle 16 may be installed. In the embodiment shown, the two separate ducts 45', 45" (FIG. 3B) are connected to the annular quasi-scroll 49 (FIG. 4A) at a connection point C such that the quasi-scroll 49 may be secured to the engine core 13 separately from the ducts 45', 45". In the present case, after the engine core 13 is installed in the desired position, the quasi-scroll 49 is installed and then the ducts 45', 45" are installed and connected to the quasi-scroll 49 at the connection point C.

The above description is meant to be exemplary only, and one skilled in the relevant arts will recognize that changes may be made to the embodiments described without departing from the scope of the invention disclosed. The present disclosure may be embodied in other specific forms without departing from the subject matter of the claims. Also, one skilled in the relevant arts will appreciate that while the air intakes and gas turbine engines disclosed and shown herein may comprise a specific number of elements/components, the air intakes and gas turbine engines could be modified to include additional or fewer of such elements/components. The present disclosure is also intended to cover and embrace all suitable changes in technology. Modifications which fall within the scope of the present invention will be apparent to those skilled in the art, in light of a review of this disclosure, and such modifications are intended to fall within the appended claims. Also, the scope of the claims should not be limited by the preferred embodiments set forth in the examples, but should be given the broadest interpretation consistent with the description as a whole.

The invention claimed is:

1. A turboprop gas turbine engine adapted to be mounted to an aircraft, the turboprop gas turbine engine comprising:
   an engine core and a gearbox driving a propeller, the engine core and the gearbox being enclosed within a nacelle, the propeller located rearward of the gearbox and the engine core relative to a direction of travel of the aircraft, the turboprop gas turbine engine being a pusher engine;
   an air intake disposed within the nacelle and formed to direct ambient air into the engine core of the turboprop gas turbine engine, the air intake including an air inlet duct having a forward-facing intake inlet receiving the ambient air, the air inlet duct including an upstream section and a downstream section, the upstream section of the air inlet duct in fluid communication with the intake inlet and extending downstream from the intake inlet, the downstream section of the air inlet duct fluidly connected to and directing air from the upstream section into an engine air inlet of the engine core, and a second air outlet duct located within the nacelle, the second air outlet duct directing air into an air-cooled-oil-cooler (ACOC); and
   an inertial particle separator (IPS) located downstream of the intake inlet and upstream of the engine air inlet, the inertial particle separator operable to redirect FOD particles in the air flowing through the air inlet duct into an IPS duct connected in fluid flow communication with the air inlet duct, the ACOC and the IPS being integrated into a common duct located axially forward of the engine core.

2. The turboprop gas turbine engine as defined in claim 1, wherein the ACOC and the second air outlet duct are located axially forward of the engine core.

3. The turboprop gas turbine engine as defined in claim 1, wherein the second air outlet duct is connected to the air inlet duct at a location between the upstream section and the downstream section thereof.

4. The turboprop gas turbine engine as defined in claim 3, wherein the second air outlet duct is connected in fluid flow communication with the air inlet duct at a location between the intake inlet and the engine air inlet, the second air outlet duct directing air from the upstream section of the air inlet duct to the ACOC.

5. The turboprop gas turbine engine as defined in claim 1, wherein the second air outlet duct has an inlet located outside of the nacelle, the airflow for the ACOC within the second air outlet duct being distinct from the air directed through the air inlet duct and into the engine air inlet of the engine core.

6. The turboprop gas turbine engine as defined in claim 1, wherein the IPS includes one or more FOD-deflectors that extend at least partially into the air inlet duct, the one or more FOD-deflectors redirect the FOD particles into the IPS duct which is connected to the air inlet duct at or downstream from the one or more FOD-deflectors.

7. The turboprop gas turbine engine as defined in claim 6, wherein the one or more FOD-deflectors include a plate extending into the air inlet duct at an angle relative to an outer wall of the air inlet duct.

8. The turboprop gas turbine engine as defined in claim 7, wherein the plate is movable between a deployed position and a retracted position, and wherein in the deployed position the plate protruding into the air inlet duct to redirect FOD and in the retracted position the plate being substantially withdrawn from the airflow through the air inlet duct and generating less flow restriction.

9. The turboprop gas turbine engine as defined in claim 8, wherein the plate is actively controlled and positionable in any one or more of the deployed position, the retracted potion, and any angular position therebetween.

10. The turboprop gas turbine engine as defined in claim 7, further comprising a plurality of plates extending into the air inlet duct, at least a first one of the plurality of plates extending away from a wall of the air inlet duct in a downstream direction, and at least a second one of the plurality of plates extending from a wall of the air inlet duct in an upstream direction.

11. The turboprop gas turbine engine as defined in claim 10, wherein the second one of the plurality of plates is located more downstream within the air inlet duct relative to the first one of the plurality of plates.

12. The turboprop gas turbine engine as defined in claim 10, wherein the first one of the plurality of plates and the second one of the plurality of plates are disposed on opposite walls of the air inlet duct.

13. The turboprop gas turbine engine as defined in claim 1, wherein the engine core of the turboprop gas turbine engine defines a longitudinal axis, and the intake inlet of the air intake extends along an intake axis that is substantially parallel to the longitudinal axis.

14. The turboprop gas turbine engine as defined in claim 13, wherein the intake axis of the air intake is substantially coaxial with the longitudinal axis of the turboprop gas turbine engine.

15. The turboprop gas turbine engine as defined in claim 13, wherein the intake axis of the air intake is radially spaced apart from the longitudinal axis of the turboprop gas turbine engine.

16. A turboprop gas turbine engine adapted to be mounted to an aircraft, the turboprop gas turbine engine comprising:
   an engine core and a gearbox driving a propeller, the engine core and the gearbox being enclosed within a nacelle, the propeller located rearward of the gearbox and the engine core relative to a direction of travel of the aircraft, the turboprop gas turbine engine being a pusher engine;
   an air inlet duct located within the nacelle, the air inlet duct having a forward-facing intake inlet receiving ambient air from outside the nacelle and an outlet in fluid flow communication with the engine core;
   an oil cooler duct located within the nacelle, the oil cooler duct being in fluid flow communication with an air-cooled-oil-cooler (ACOC) of the turboprop gas turbine engine, an inlet of the oil cooler duct being connected with either the air inlet duct to receive air therefrom or to a separate air inlet receiving ambient air from outside the nacelle, the ACOC and the oil cooler duct located axially forward of the engine core.

17. A turboprop gas turbine engine adapted to be mounted to an aircraft, the turboprop gas turbine engine comprising:
an engine core and a gearbox driving a propeller, the engine core and the gearbox being enclosed within a nacelle, the propeller located rearward of the gearbox and the engine core relative to a direction of travel of the aircraft, the turboprop gas turbine engine being a pusher engine;
an air intake disposed within the nacelle and formed to direct ambient air into the engine core of the turboprop gas turbine engine, the air intake including an air inlet duct having a forward-facing intake inlet receiving the ambient air, the air inlet duct including an upstream section and a downstream section, the upstream section of the air inlet duct in fluid communication with the intake inlet and extending downstream from the intake inlet, the downstream section of the air inlet duct fluidly connected to and directing air from the upstream section into an engine air inlet of the engine core, and a second air outlet duct located within the nacelle, the second air outlet duct directing air into an air-cooled-oil-cooler (ACOC); and
an inertial particle separator (IPS) located downstream of the intake inlet and upstream of the engine air inlet, the inertial particle separator operable to redirect FOD particles in the air flowing through the air inlet duct into an IPS duct connected in fluid flow communication with the air inlet duct, the IPS duct being located axially forward of the engine core.

18. The turboprop gas turbine engine of claim 17, wherein the ACOC and the IPS are integrated into a common duct located axially forward of the engine core.

19. The turboprop gas turbine engine of claim 17, wherein the ACOC and the second air outlet duct are located axially forward of the engine core.

20. The turboprop gas turbine engine as defined in claim 17, wherein the second air outlet duct is connected to the air inlet duct at a location between the upstream section and the downstream section thereof.

* * * * *